(12) United States Patent
Ko

(10) Patent No.: US 10,571,695 B2
(45) Date of Patent: Feb. 25, 2020

(54) GLASS TYPE TERMINAL AND CONTROL METHOD THEREFOR

(71) Applicant: LG ELECTRONICS INC., Seoul (KR)

(72) Inventor: Dongseuck Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/576,140

(22) PCT Filed: Dec. 16, 2015

(86) PCT No.: PCT/KR2015/013820
§ 371 (c)(1),
(2) Date: Nov. 21, 2017

(87) PCT Pub. No.: WO2016/190505
PCT Pub. Date: Dec. 1, 2016

(65) Prior Publication Data
US 2018/0136466 A1    May 17, 2018

(30) Foreign Application Priority Data

May 28, 2015 (KR) .................. 10-2015-0075119

(51) Int. Cl.
*G09G 1/00* (2006.01)
*G02B 27/01* (2006.01)
(Continued)

(52) U.S. Cl.
CPC ......... *G02B 27/0172* (2013.01); *G06F 3/017* (2013.01); *G09G 3/20* (2013.01);
(Continued)

(58) Field of Classification Search
CPC ... G09G 5/00; G09G 3/20; G09G 1/00; G06F 3/01; G06F 3/041; G06F 3/044; G06T 19/00; G06K 9/00
See application file for complete search history.

(56) References Cited

U.S. PATENT DOCUMENTS

2013/0307856 A1* 11/2013 Keane ................ G10L 21/10
345/473
2014/0225812 A1* 8/2014 Hosoya ............ G02B 27/017
345/8

(Continued)

FOREIGN PATENT DOCUMENTS

JP    2010-139901 A    6/2010
JP    2012-151667 A    8/2012
(Continued)

*Primary Examiner* — Michael A Faragalla
(74) *Attorney, Agent, or Firm* — Birch, Stewart, Kolasch & Birch, LLP

(57) ABSTRACT

The present invention provides a glass type terminal comprising: a frame formed to be fixable to a user's head; a display unit mounted on the frame and outputting visual information; an optical unit formed from at least one lens and forming an image from the visual information; a user input unit for sensing a control command for changing a operating mode; and a control unit for controlling the display unit such that the visual information changes on the basis of the change of the operating mode, and controlling the optical unit such that a focal length of the image changes according to the changed operating mode.

16 Claims, 33 Drawing Sheets

(51) Int. Cl.
*G06F 3/01* (2006.01)
*G09G 3/20* (2006.01)

(52) U.S. Cl.
CPC ............ *G02B 2027/014* (2013.01); *G02B 2027/0138* (2013.01); *G02B 2027/0147* (2013.01); *G02B 2027/0178* (2013.01); *G09G 2320/0606* (2013.01); *G09G 2320/0613* (2013.01)

(56) References Cited

U.S. PATENT DOCUMENTS

| | | | |
|---|---|---|---|
| 2014/0266986 A1* | 9/2014 | Magyari | G02B 27/0172 345/8 |
| 2015/0049018 A1* | 2/2015 | Gomez | G09G 3/001 345/156 |
| 2016/0054802 A1* | 2/2016 | Dickerson | G06F 3/0487 345/158 |
| 2016/0291329 A1* | 10/2016 | Kimura | G02B 27/0172 |

FOREIGN PATENT DOCUMENTS

| | | |
|---|---|---|
| JP | 2014-241523 A | 12/2014 |
| KR | 10-2012-0132096 A | 12/2012 |

* cited by examiner

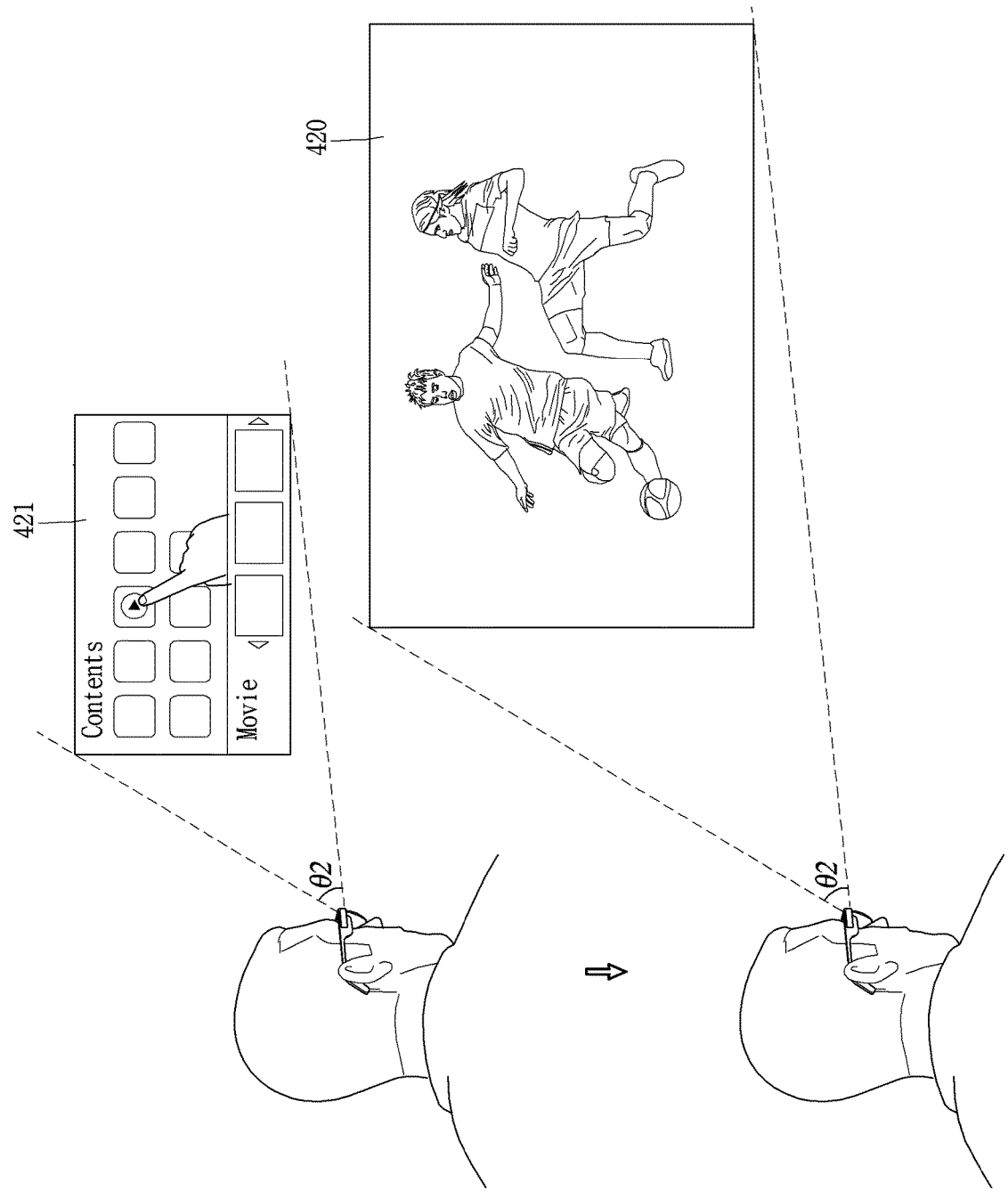

GLASS TYPE TERMINAL AND CONTROL METHOD THEREFOR

CROSS REFERENCE TO RELATED APPLICATIONS

This application is the National Phase of PCT International Application No. PCT/KR2015/013820, filed on Dec. 16, 2015, which claims priority under 35 U.S.C. 119(a) to Patent Application No. 10-2015-0075119, filed in Republic of Korea on May 28, 2015, all of which are hereby expressly incorporated by reference into the present application.

TECHNICAL FIELD

The present invention relates to a glass type terminal having a display unit for outputting images according to different modes.

BACKGROUND ART

A wearable glass type terminal which is wearable on a part of a human body is recently developed. A glass type terminal worn on a user's head may correspond to a head mounted display (HMD). A display unit provided in a glass type terminal such as an HMD may provide various conveniences to a user by combining with an augmented reality technology, an N-screen technology and the like beyond a simple image output function.

However, since the display unit of such a glass type terminal is operated to output an image with a fixed size on a fixed position in a state of being worn on the user's head, various functions cannot be realized, or an output of an image at a user-desired position is difficult.

DISCLOSURE OF THE INVENTION

Accordingly, an aspect of the present invention is to provide a glass type terminal having a display unit capable of outputting an image having various sizes corresponding to different functions at desired positions.

To achieve these and other advantages and in accordance with the purpose of this specification, as embodied and broadly described herein, there is provided a glass type terminal, including a frame formed to be fixable to a user's head, a display unit mounted on the frame and configured to output visual information, an optical unit having at least one lens and forming an image of the visual information, a user input unit configured to sense a control command for changing an operating mode, and a controller configured to control the display unit to change the visual information based on the change of the operating mode and control the optical unit to change a focal length of the image according to the changed operating mode.

In one embodiment disclosed herein, a size of the image and an output position of the image may be changed based on the change of the focal length of the image, so that different visual information can be formed in an appropriate size and output at a different output position.

In one embodiment disclosed herein, the glass type terminal may further include a gesture sensing unit configured to sense a gesture formed by a hand. Accordingly, the adjustment of the size and output position of the image in one operating mode as well as the change of the operating mode can be performed by the gesture, which may allow the user to receive visual information in a desired size at a desired position.

In one embodiment disclosed herein, when the operating mode is switched while the size of the image is changed based on the gesture by the motion of the hand, an indicator indicating this can be output.

Effects of the Invention

According to the present invention, in a glass type terminal in which various operating modes for executing different functions are activated, an image corresponding to each operating mode can be output in an appropriate form for each function. In detail, visual information can be formed as an image in a different size and be output at a different position according to characteristics of the visual information, which may allow the user to be provided with the image in a suitable environment.

In addition, since a size and output position of an image which is output in the same operating mode can be changed based on a user's control command, the user can be provided with visual information as an image in a desired shape.

BRIEF DESCRIPTION OF THE DRAWINGS

FIGS. 9A to 9C are conceptual views illustrating a control method of controlling a function in an activated state of an operating mode.

BEST MODE OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present invention is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
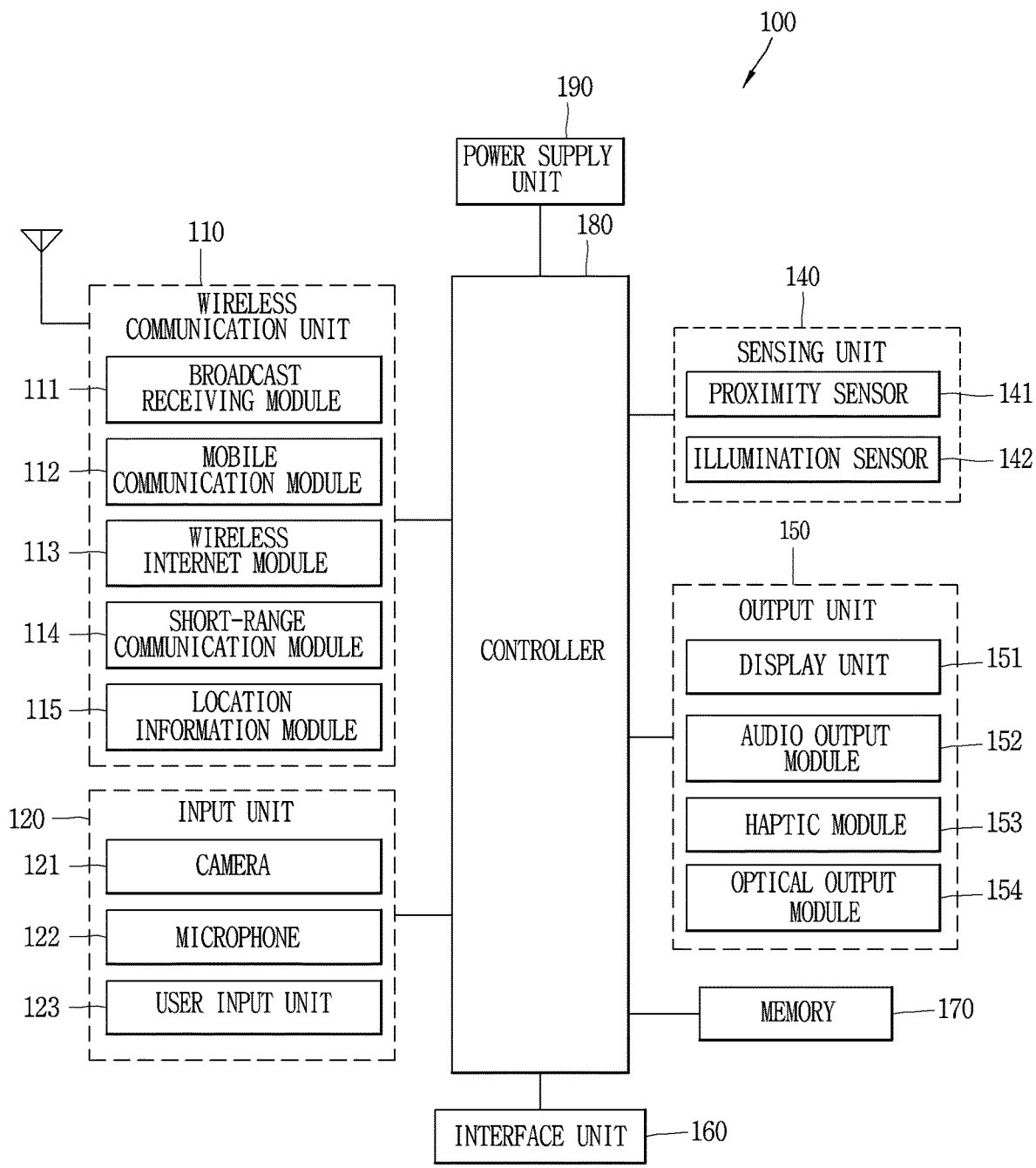
FIG. 1 is a block diagram of a glass type terminal in accordance with the present invention.

FIG. 1A is a block diagram of a glass type terminal in accordance with the present invention. The glass type terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the glass type terminal 100 and a wireless communication system, communications between the glass type terminal 100 and another glass type terminal, or communications between the glass type terminal 100 and an external server. Further, the wireless communication unit 110 may typically include one or more modules which connect the glass type terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the glass type terminal, the surrounding environment of the glass type terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The glass type terminal disclosed herein may be configured to utilize information obtained from one or more sensors, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the glass type terminal 100 and the user and simultaneously provide an output interface between the glass type terminal 100 and a user.

The interface unit 160 serves as an interface with various types of external devices that are coupled to the glass type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glass type terminal 100 may perform assorted control functions associated with a connected external device, in response to the external device being connected to the interface unit 160.

The memory 170 is typically implemented to store data to support various functions or features of the glass type terminal 100. For instance, the memory 170 may be configured to store application programs executed in the glass type terminal 100, data or instructions for operations of the glass type terminal 100, and the like. Some of these application programs may be downloaded from an external server via wireless communication. Other application programs may be installed within the glass type terminal 100 at the time of manufacturing or shipping, which is typically the case for basic functions of the glass type terminal 100 (for example, receiving a call, placing a call, receiving a message, sending a message, and the like). Application programs may be stored in the memory 170, installed in the glass type terminal 100, and executed by the controller 180 to perform an operation (or function) for the glass type terminal 100.

The controller 180 typically functions to control an overall operation of the glass type terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that has been stored in the memory 170. In addition, the controller 180 may control at least two of those components included in the glass type terminal to activate the application program.

The power supply unit 190 may be configured to receive external power or provide internal power in order to supply appropriate power required for operating elements and components included in the glass type terminal 100. The power supply unit 190 may include a battery, and the battery may be configured to be embedded in the terminal body, or configured to be detachable from the terminal body.

In addition, the glass type terminal 100 according to the present invention may include an optical unit 130 that forms (generates) a reversed image of visual information. Images of various sizes may be displayed at various positions based on the optical unit 130.

At least part of the components may cooperatively operate to implement an operation, a control or a control method of a glass type terminal according to various embodiments disclosed herein. Also, the operation, the control or the control method of the glass type terminal may be implemented on the glass type terminal by an activation of at least one application program stored in the memory 170.

Figure 2A:
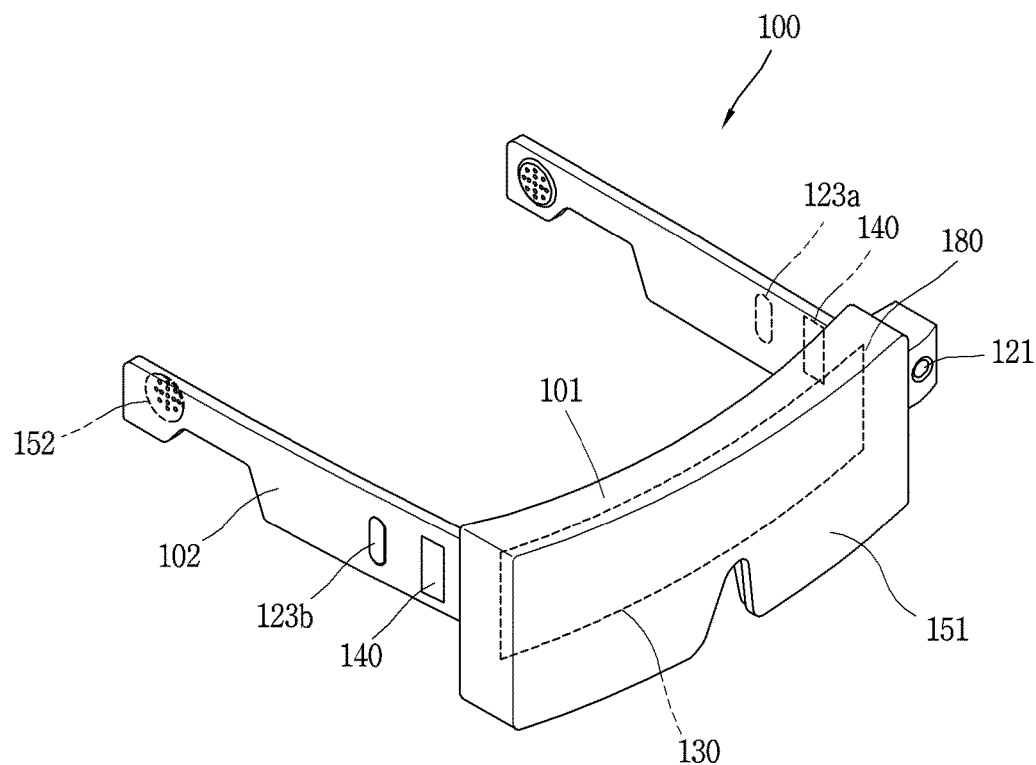
FIG. 2A is a view of a glass type terminal according to one embodiment of the present invention, viewed from one direction.
Figure 2B:
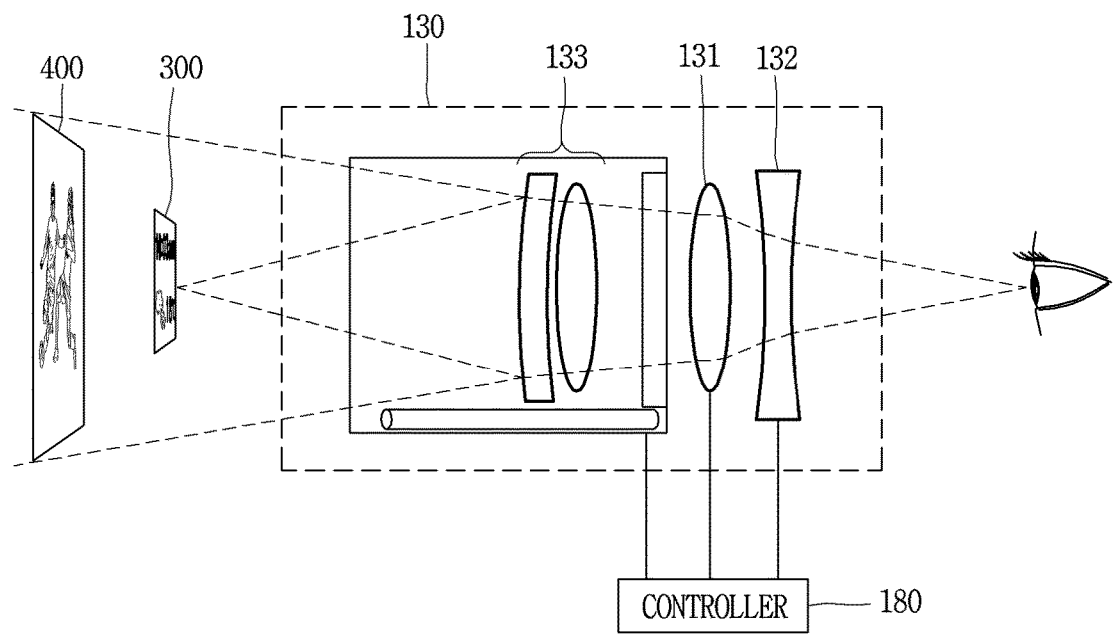
FIG. 2B is a conceptual view illustrating an optical unit included in FIG. 2A.
Figure 2C:
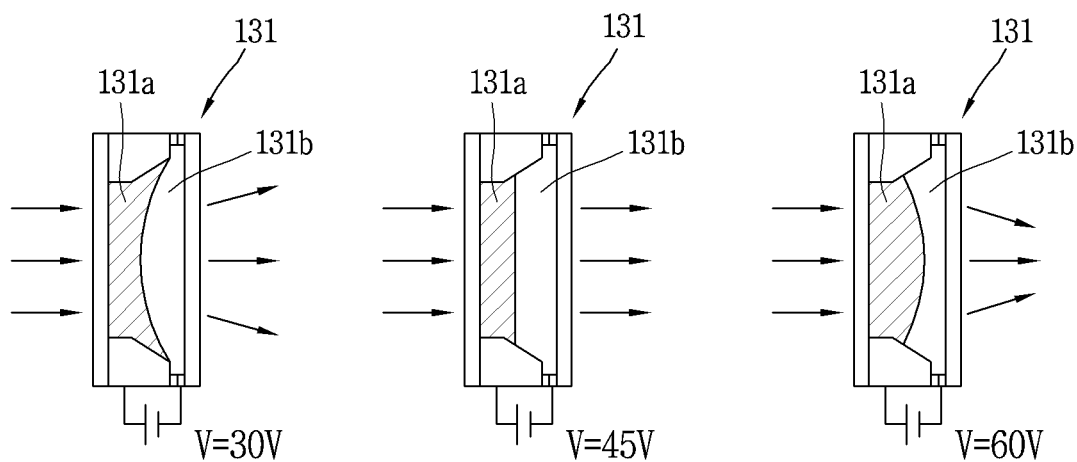
FIG. 2C is a conceptual view illustrating a shape-deformable lens.

FIG. 2A is a view of a glass type terminal according to one embodiment of the present invention, viewed from one direction. FIG. 2B is a conceptual view illustrating an optical unit included in FIG. 2A. FIG. 2C is a conceptual view illustrating a shape-deformable lens.

The glass type terminal 100 according to FIG. 2A may correspond to a head-mounted display (HMD) type terminal. The glass type terminal 100 may include a frame (or a frame part) 101 and 102, an input unit 123, a sensing unit 140, a display unit 151, an optical unit 130, an audio output module 152, a controller (or a control unit) 180, a wireless communication unit 110, an interface unit 160, a memory 170, a power supply unit 190, and the like. The head-mounted display described herein may have more or fewer components than the components listed above.

More specifically, the glass type terminal 100 according to the present invention may be formed to be wearable on a head of a human body (or a head portion, a face, etc.), and include a frame (a case, a housing, a cover, etc.). The frame may be formed of a flexible material to facilitate wearing. This drawing illustrates that the frame part includes a first frame 101 and a second frame 102 which are made of different materials.

The frame is supported on the head, and defines a space for mounting various components. As illustrated, electronic components such as the controller 180, the sensing unit 140, the user input unit 123, the audio output module 152 and the like may be mounted on the frame. In addition, the display unit 151, which covers at least one of the left and right eyes, may be detachably mounted on the frame.

The controller 180 is configured to control various electronic components included in the glass type terminal 100. The controller 180 may be understood as a component corresponding to the controller 180 described above. In this drawing, the controller 180 is provided in a frame portion at one side of the head. However, the position of the controller 180 is not limited thereto.

The camera 121 is disposed adjacent to at least one of the left eye and the right eye, to capture (take, photograph) an image of a front side. Since the camera 121 is disposed adjacent to the eye, the camera 121 may acquire a scene viewed by the user as an image.

This drawing illustrates that the camera 121 is provided at the controller 180, but the present invention is not limited thereto. The camera 121 may also be provided on the frame or provided in plurality to acquire a stereoscopic image.

The glass type terminal 100 may include user input units 123a and 123b manipulated to receive a control command. The user input units 123a and 123b may employ any method so long as it can be operated by the user in a tactile manner, such as touching or pushing. This drawing illustrates that the user input units 123a and 123b operated in pushing and touching manners are provided on the frame and the controller 180, respectively.

The sensing unit 140 provided in the glass type terminal 100 may include at least one sensor for sensing at least one of internal information on the glass type terminal 100, a status of the glass type terminal, surrounding environment information regarding the glass type terminal, and user information (or a user posture).

In addition, the glass type terminal 100 may be provided with a microphone (not illustrated) for receiving sound and processing the sound into an electric audio data, and an audio output module 152 for outputting sound. The audio output module 152 may be configured to transmit sound in a general sound output manner or a bone-conduction mode. In case where the audio output module 152 is implemented in the bone-conduction manner, when the user wears the glass type terminal 100, the audio output module 152 is brought into close contact with the head and vibrates a skull to transmit sound.

The wireless communication unit is provided with at least one module enabling wireless communications between the glass type terminal 100 and a wireless communication system, between the glass type terminal 100 and an external device, between the glass type terminal 100 and a remote controller for controlling the same, and between the glass type terminal 100 and an external server. The wireless communication unit may include at least one module connecting the glass type terminal 100 to at least one network.

The interface unit serves as an interface with various types of external devices that are coupled to the glass type terminal 100. The memory is configured to store data to support various functions of the glass type terminal 100.

The controller 180 typically functions to control an overall operation of the glass type terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that has been stored in the memory 170. In addition, the controller 180 may control at least two of those components included in the glass type terminal to activate the application program.

The power supply unit may be configured to receive external power or internal power in order to supply appropriate power required for operating the components included in the glass type terminal 100. The power supply unit may include a battery, and the battery may be configured as an embedded battery or a detachable battery.

The display unit 151 is mounted on the head and serves to directly display an image in front of the user's eyes. When the user wears the HMD 100, the display unit 151 may be arranged to correspond to at least one of the left eye and the right eye so that an image can be displayed directly in front of the user's eyes. This drawing illustrates that the display unit 151 is positioned so as to cover both the left and right eyes so that an image can be output toward both the left and right eyes of the user.

In addition, screen information output by the display unit 151 may be projected to the user's eyes in a form of a virtual image 400 formed through the optical unit 130 including a plurality of lenses.

Referring to FIGS. 2A and 2B, the optical unit 130 includes first and second lenses 131 and 132 and a zoom lens portion 133. The first and second lenses 131 and 132 may be shape-deformable lenses so as to have variable focal distances (or focal lengths).

Referring to FIG. 2C, the first lens 131 includes two kinds of first and second liquid layers 131a and 131b which are provided between a pair of substrates, have different refractive indexes and are not mixed with each other. The first liquid layer 131a is a type of oil having an insulating property and non-polarity, and the second liquid layer 131b is formed of an electrically conductive aqueous solution. Each of the pair of substrates is provided with an electrode to apply electricity, and an insulator coated on the electrode.

When the first liquid layer 131a and the electrodes of the pair of substrates are connected by installing an electrode with an opposite polarity on a substrate adjacent to the second liquid layer 131b, the first lens 131 has a structure like a capacitor. When a voltage is applied to the first lens 131, surface tension of the second liquid layer is changed and thereby a curvature between the two liquid layers is changed. Accordingly, the focal length (or focal distance) of the first lens 131 is changed. As illustrated, the controller 180 may adjust the focal length by applying the voltage to the first lens 131.

The display unit 151 that outputs visual information 300 may be disposed between a focal point of the first lens 131 and the first lens 131. Accordingly, an image 400 is always formed in an enlarged reversed shape of the visual information 300.

Accordingly, a size of the image 400 and an output position of the image 400 may be controlled by adjusting the focal length. The image 400 may get farther when the image 400 is enlarged, whereas getting closer when the image 400 is reduced, on the basis of the focal length.

The first lens 131 has a convex lens structure and a variable (adjustable) refractive index, and the second lens 132 has a concave lens structure and a variable refractive index. The second lens 132 is disposed between the user's eye and the first lens 132. The second lens 132 adjusts a position at which the image 400 is formed. Accordingly, the size of the image 400 and the position at which the image 400 is formed can be adjusted by the first and second lenses 131 and 132.

Therefore, the image 400 can be output at different positions based on vision of the user's eye. This may result in providing the user with the clear image 400 by the first and second lenses 131 and 132 without a separate device for correcting the user's vision.

Since the output position of the image 400 is adjusted by the second lens 132, a small optical unit may be realized in a state where a distance between the optical unit and the user's eye is fixed.

The optical unit 130 further includes a zoom lens portion 133 that is controlled to output the image 400 in a manner of enlarging or reducing the visual information 300. The zoom lens portion 133 includes a plurality of lenses, and also includes an actuator for moving the plurality of lenses along an optical axis. The zoom lens portion 133 outputs a part or all of the image 400 in an enlarging manner based on a user's control command.

The controller 180 may independently control the first and second lenses 131 and 132 and the zoom lens portion 133. The user may input independent control signals to independently control the first and second lenses 131 and 132 and the zoom lens portion 133, thereby arbitrarily changing the size and output position of the image.

Figure 3A:
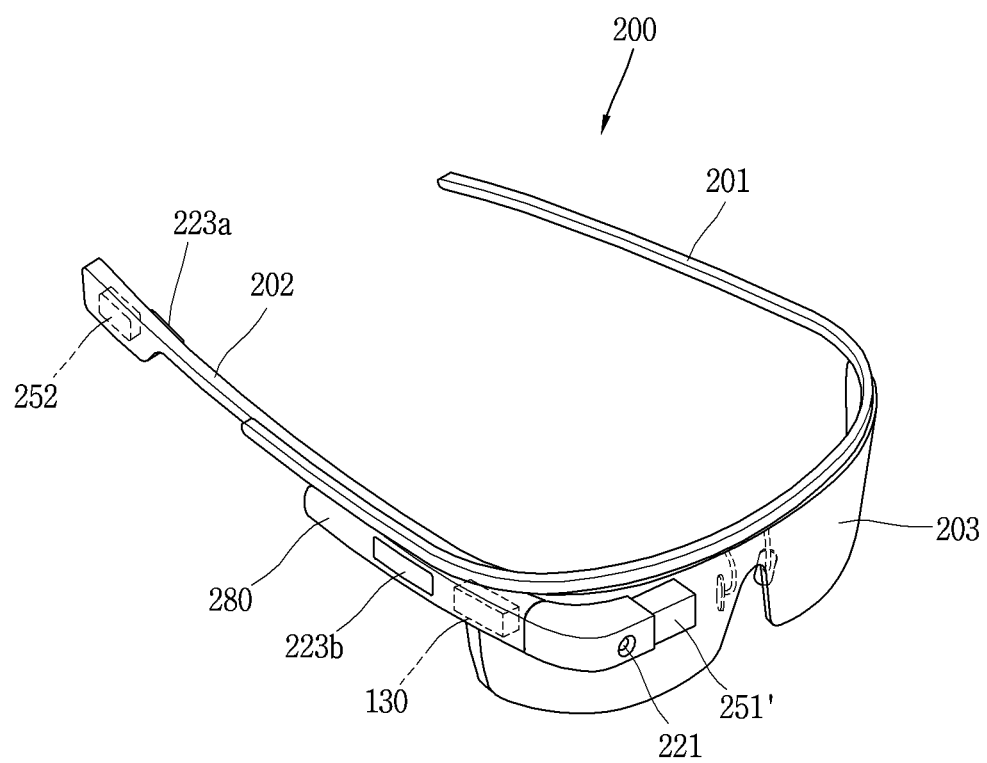
FIG. 3A is a view of a glass type terminal according to another embodiment, viewed from one direction.
Figure 3B:
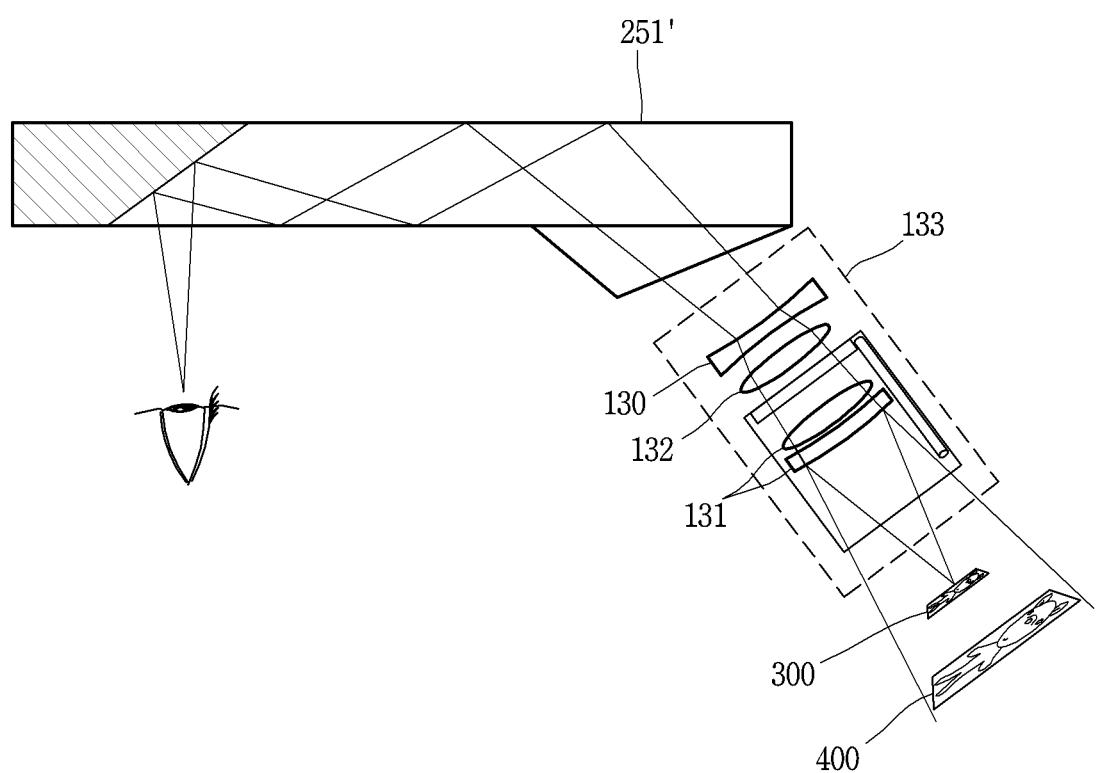
FIG. 3B is a conceptual view illustrating an optical unit included in the glass type terminal of FIG. 3A.
Figure 4A:
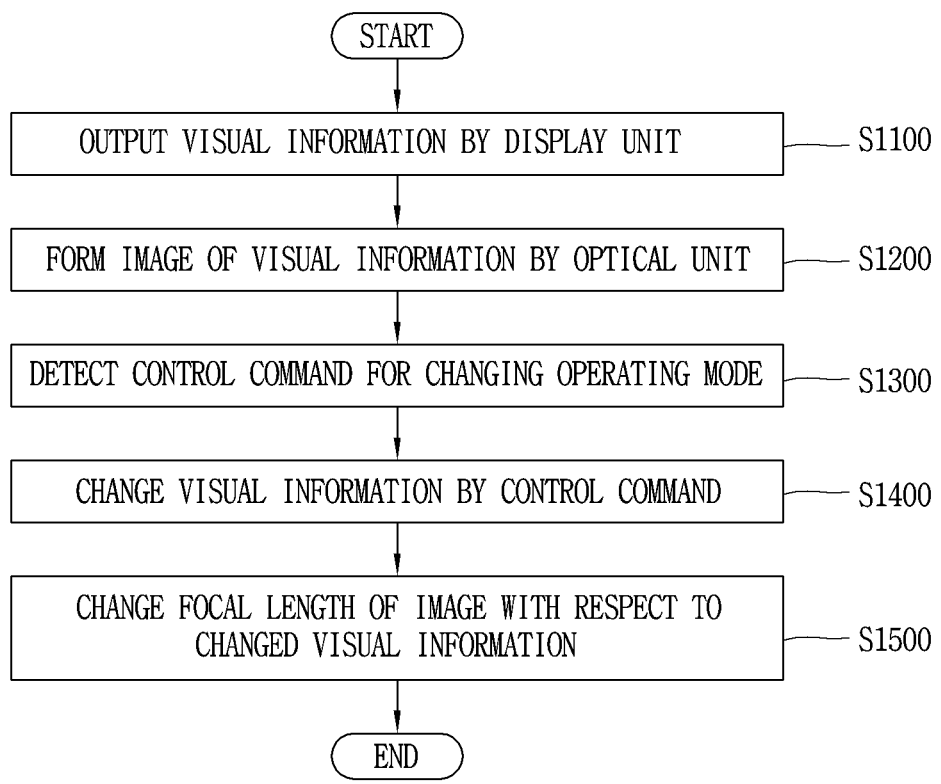
FIG. 4A is a conceptual view illustrating a control method of a glass type terminal according to one embodiment of the present invention.

A method of controlling the output position and size of the image 400 will be described later in detail with reference to FIG. 4A FIG. 3A is a view of a glass type terminal according to another embodiment, viewed from one direction, and FIG. 3B is a conceptual view illustrating an optical unit included in the glass type terminal of FIG. 3A.

Referring to FIG. 3A, a glass type terminal 200 may be formed to be wearable on a head of a human body (or a head, a face, etc.), and include a frame (a frame part, a case, a housing, a cover, etc.) for this. The frame may be formed of a flexible material to facilitate wearing. This drawing illustrates that the frame part includes a first frame 201 and a second frame 202 which are made of different materials. In general, the glass type terminal 200 may include the same/like features to the glass type terminal 100 of FIGS. 1A to 1C.

The frame is supported on the head, and defines a space for mounting various components. As illustrated, electronic components such as a control module 280, an audio output module 252 and the like may be mounted on the frame. Also, a prism 251' covering at least one of a left eye and a right eye may be detachably mounted on the frame.

The control module 280 is configured to control various electronic components included in the glass type terminal 200. The control module 280 may be understood as a component corresponding to the controller 180 described above. This drawing illustrates that the control module 280 is installed on the frame at one side of the head. However, the position of the control module 280 is not limited thereto.

A camera 221 is disposed adjacent to at least one of the left eye and the right eye, to capture (take, photograph) an image of a front side. Since the camera 221 is disposed adjacent to the eye, the camera 221 may acquire a scene viewed by the user as an image.

The glass type terminal 200 may include user input units 223a and 223b manipulated to receive a control command. The user input units 223a and 423b may employ any method so long as it can be operated by the user in a tactile manner, such as touching or pushing. This drawing illustrates that the user input units 223a and 223b operated in pushing and touching manners are provided on the frame and the control module 280, respectively.

In addition, the glass type terminal 200 may be provided with a microphone (not illustrated) for receiving sound and processing the sound into an electric audio data, and an audio output module 252 for outputting sound.

Visual information 300 output through the display unit may be viewed in a manner of overlapping a general view through the optical unit 130 and the prism 251'. The glass type terminal 200 may provide Augmented Reality (AR), in which a virtual image is superimposed on the real image 400 or a background to be viewed as a single image, by using the characteristics of the display. The optical unit 130 may be installed in the frame 201. That is, the optical unit 130 is not positioned in the field of view of the user.

The structure in which the image 400 is output through the optical unit 130 according to FIG. 3B is substantially the same as the structure described in FIG. 2B except for the prism 251'. The optical unit 130 includes the first and second lenses 131 and 132 and the zoom lens portion 133. The image 400 formed by the optical unit 130 may be reflected by the prism 251' and provided to the user's eye.

However, the structure of the optical unit and the display unit of the glass type terminal is not limited thereto. The controller controls the optical unit to form the visual information 300 output on the display unit into the image 400 of various sizes and output it on various positions based on the user's control command. Hereinafter, a detailed control method of providing the image 400 by controlling the optical unit will be described.

Figure 4B:
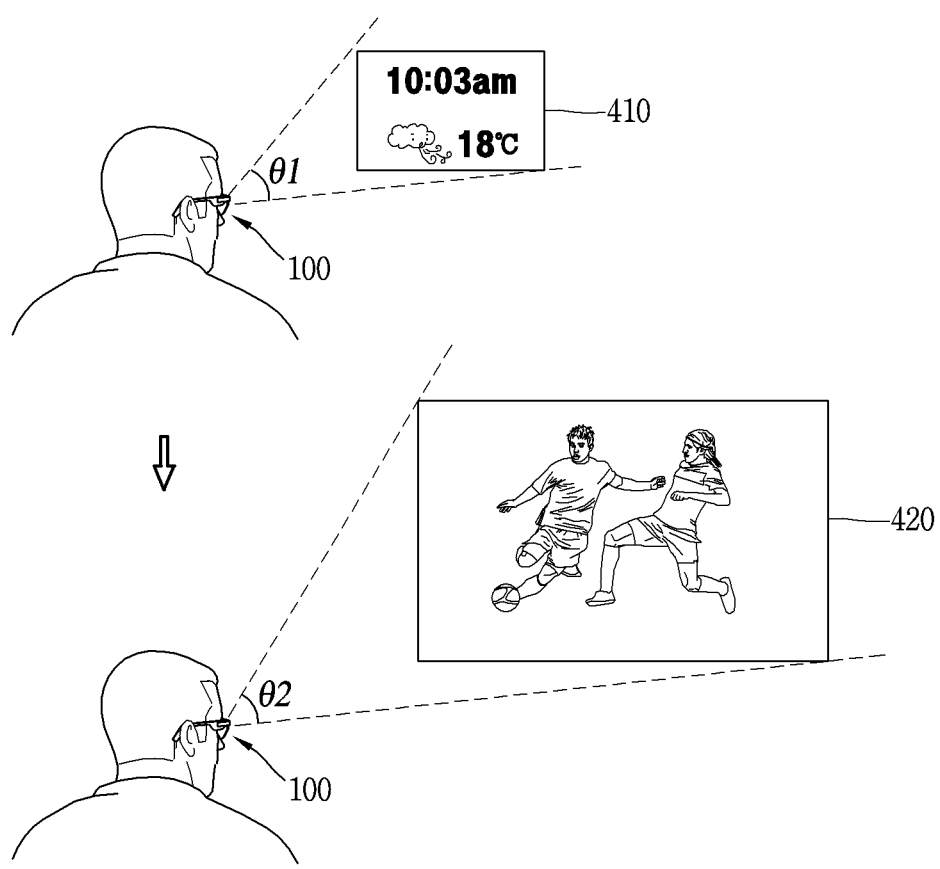
FIG. 4B is a conceptual view illustrating the control method of FIG. 4A.
Figure 4C:
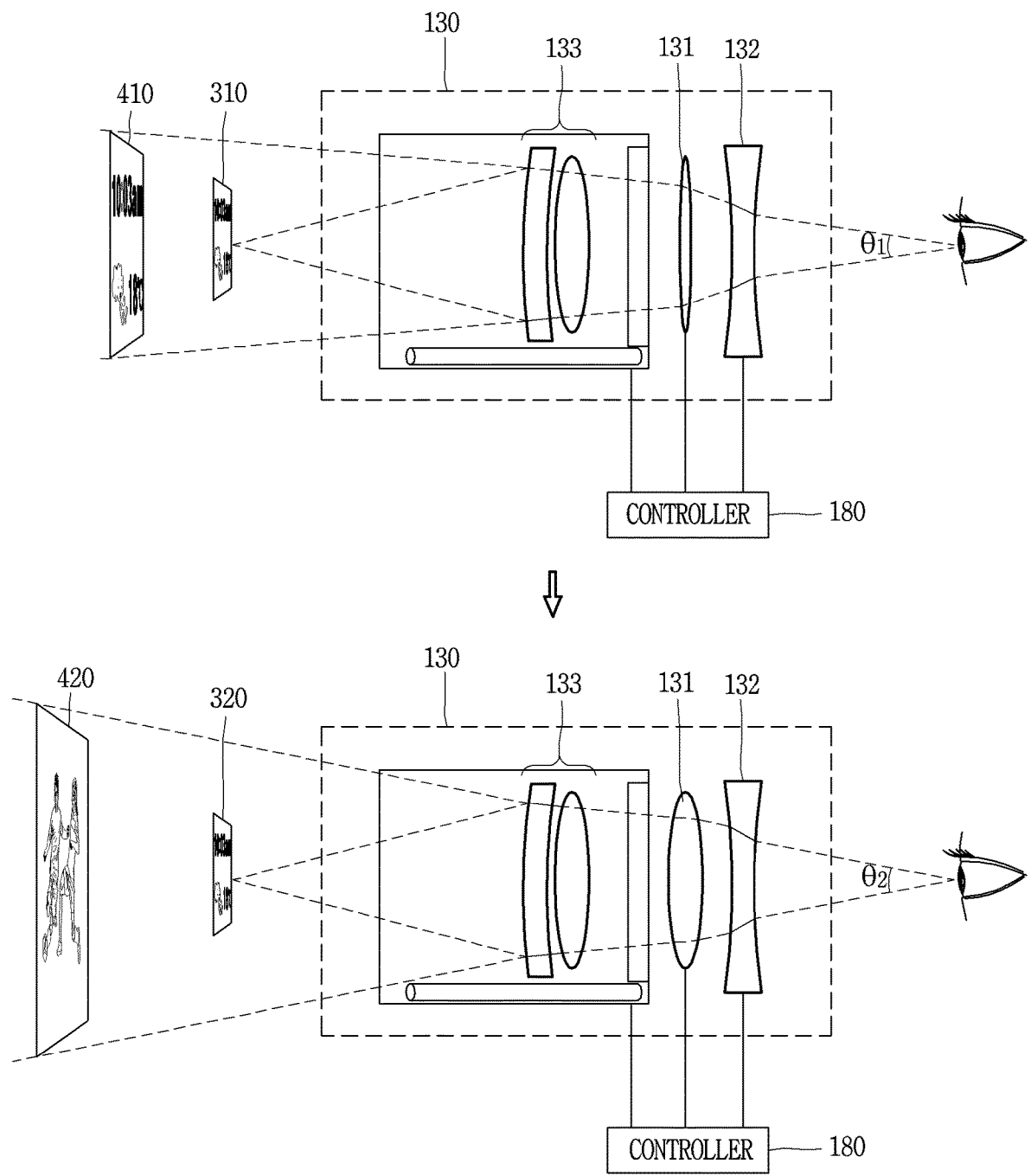
FIG. 4C is a conceptual view illustrating a structure of the optical unit by the control method.

FIG. 4A is a conceptual view illustrating a control method of a glass type terminal according to one embodiment of the present invention. FIG. 4B is a conceptual view illustrating the control method of FIG. 4A, and FIG. 4C is a conceptual view illustrating the structure of the optical unit by the control method.

The display unit 151 outputs the visual information 300 (S1100). There is no limitation on the type of the visual information 300. For example, the visual information 300 may include information on a current state of the terminal, specific screen information, an execution screen in response to an execution of a specific function, an augmented reality (AR) image, and the like.

The glass type terminal 100 according to one exemplary embodiment may output different visual information based on an activated operating mode (or driving mode). The controller may activate one of a plurality of operating modes, and the number of the operating modes is not limited. For example, when a first mode is an information providing mode, the display unit outputs first visual information 310 which includes a current time, a date, a weekday, and the like. In the first mode, a first image 410 may be output at a position away from the user by about 0.2 m to 0.5 m.

In a second mode, which is different from the first mode, an application set by the user may be executed, and the user may output an execution screen of the executed application as second visual information 320.

The optical unit 130 forms the image 400 of the visual information 300. The optical unit 130 controls the first and second lenses 131 and 132 such that the image 400 has a preset size and is output at a preset position based on the operating mode.

Referring to FIGS. 4B and 4C, the display unit 151 outputs first visual information 310 and forms an image 410 by the first and second lenses 131 and 132 in the first mode.

A control command for the change of the operating mode is detected (S1300). The control command may be detected by The user input unit 123, 223. Alternatively, the glass type terminal may further include a gesture sensing unit for sensing a gesture formed by the user's hand motion.

The controller changes the visual information based on the control command (S1400) and changes a focal length of an image with respect to the changed visual information (S1500).

Referring to FIGS. 4B and 4C, the operating mode may be changed from the first mode to the second mode based on the control command. The display unit outputs second visual information 320 corresponding to the second mode. The optical unit 130 outputs a second image 420 based on the second visual information 320. When the operating mode is changed, a focal length of the image corresponding to the visual information output on the display unit is changed. That is, a size and formation position of the image is changed.

The second image 420 is larger than the first image 410 in size and is displayed in an area relatively far from the user's view. The controller increases the refractive index of the first lens 131 according to the control command. When the refractive index increases, the focal length of the first lens 131 decreases.

The controller adjusts a field of view (FoV) of the image by adjusting the refractive indexes of the first and second lenses 131 and 132. Here, the field of view corresponds to a viewing angle for outputting the image with respect to the optical unit 130. That is, the field of view corresponds to the size of the image. When the operating mode is changed from the first mode to the second mode, the field of view is changed from a first angle of view $\theta 1$ to a larger second angle of view $\theta 2$. In the second mode, the second image 420 is formed in an area relatively far from the user. For example, the first angle of view $\theta 1$ may be set to about 10°, and the second angle of view $\theta 2$ may be set to about 40°.

For example, in the second mode, the display unit 151 may output an image (for example, a playback of a media file), and the user may receive the image in a larger size. An image included in the second image 410 may be output at a distance spaced apart from the user by about 10 m to about 30 m so as to be suitable for the user to view the image. However, a different size and output position may be set depending on a type of the application executed or the visual information output.

For example, the optical unit 130 may be controlled to output the image in an area of about 2 m to about 15 m away from the user for visual information providing an on-line lecture, while outputting the image in an area of about 2 m to about 15 m away from the user for visual information providing a TV image.

According to the present invention, in the glass type terminal in which various operating modes are activated to execute different functions, an image corresponding to an operating mode may be output in a suitable state for each function. In particular, images of different sizes may be formed and output at different positions according to characteristics of visual information, which may allow the user to receive images in suitable environments.

Figure 4D:
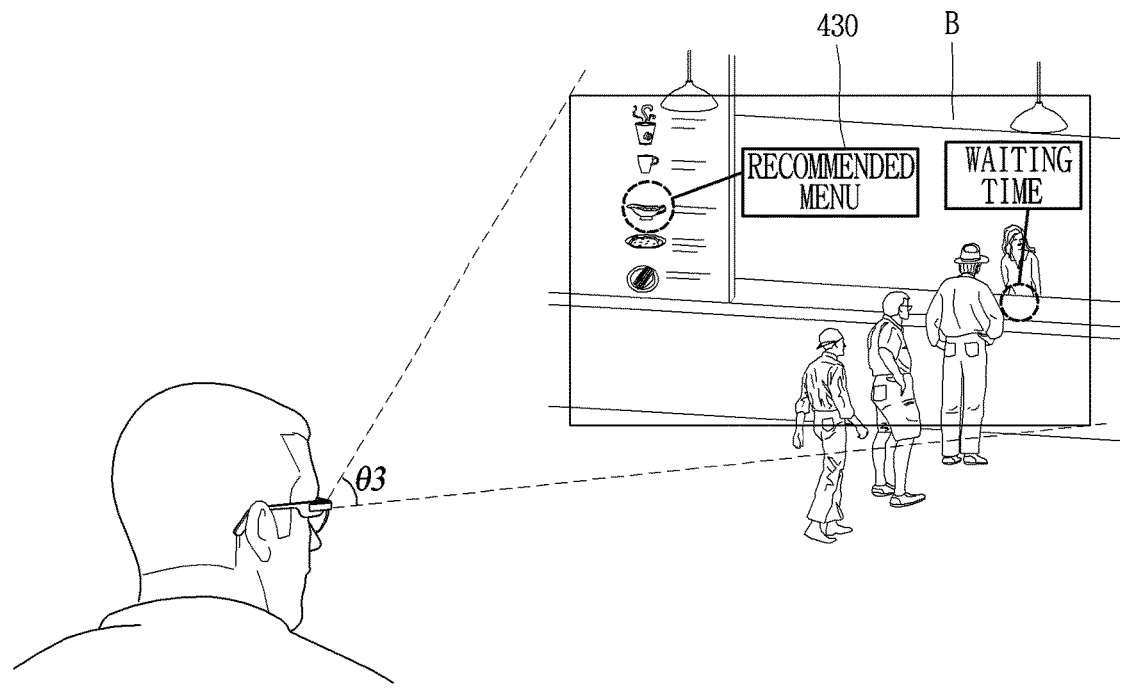
FIG. 4D is a conceptual view illustrating a control method of providing an augmented reality (AR) image.
Figure 4D:
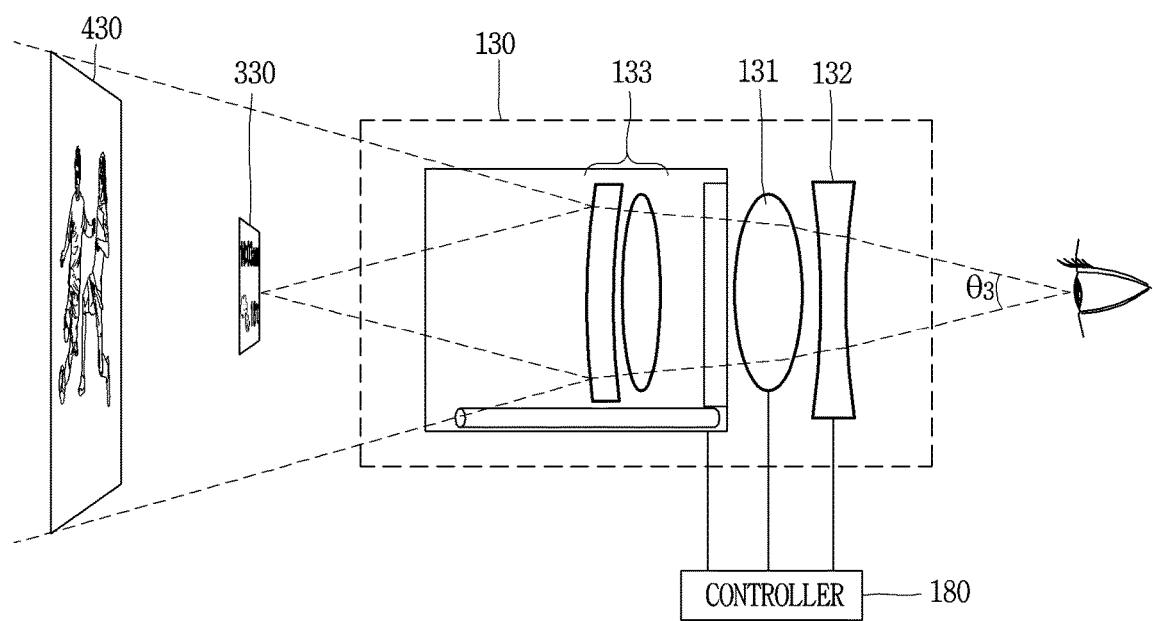

FIG. 4D is a conceptual view illustrating a control method of providing an augmented reality (AR) image.

Referring to (a) and (b) of FIG. 4D, an AR function is executed in a third mode. In the third mode, the display unit 151 outputs third visual information 330 corresponding to an AR image and the optical unit 130 forms a third image 430 of the third visual information 330. The controller 180 may adjust a voltage applied to the first lens 131 so that the refractive index of the first lens 131 increases.

The controller 180 controls the first and second lenses 131 and 132 to form a third image 430 at a third angle of view $\theta 3$ that is larger than the second angle of view $\theta 2$ and output the third image 430 in an area farther than the output position of the second image 420. For example, the second angle of view 62 may be set as about 80°, and the third image 430 may be output at a distance of about 15 m from the user.

Since the AR image is displayed as a larger image, the user can more realistically receive the AR image which overlaps an actual environment.

According to this embodiment, the controller 180 executes different functions in different modes and outputs visual information associated with the functions according to preset conditions. The user can receive visual information associated with each function in a suitable environment. Hereinafter, the feature that an operating mode is changed according to a user's control command will be described in detail.

Figure 5A:
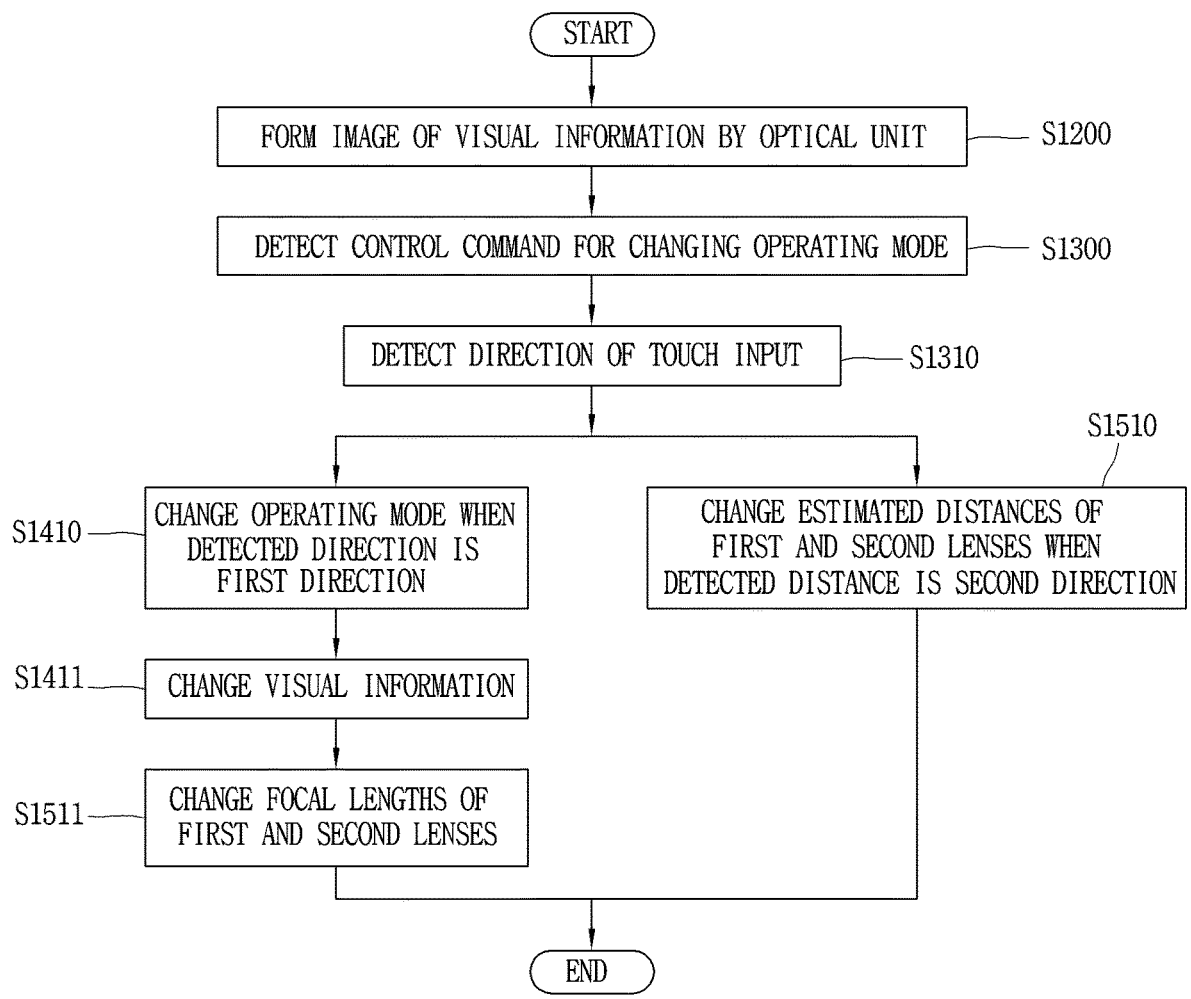
FIGS. 5A to 5F are conceptual views illustrating a control method of changing an operating mode.
Figure 5B:
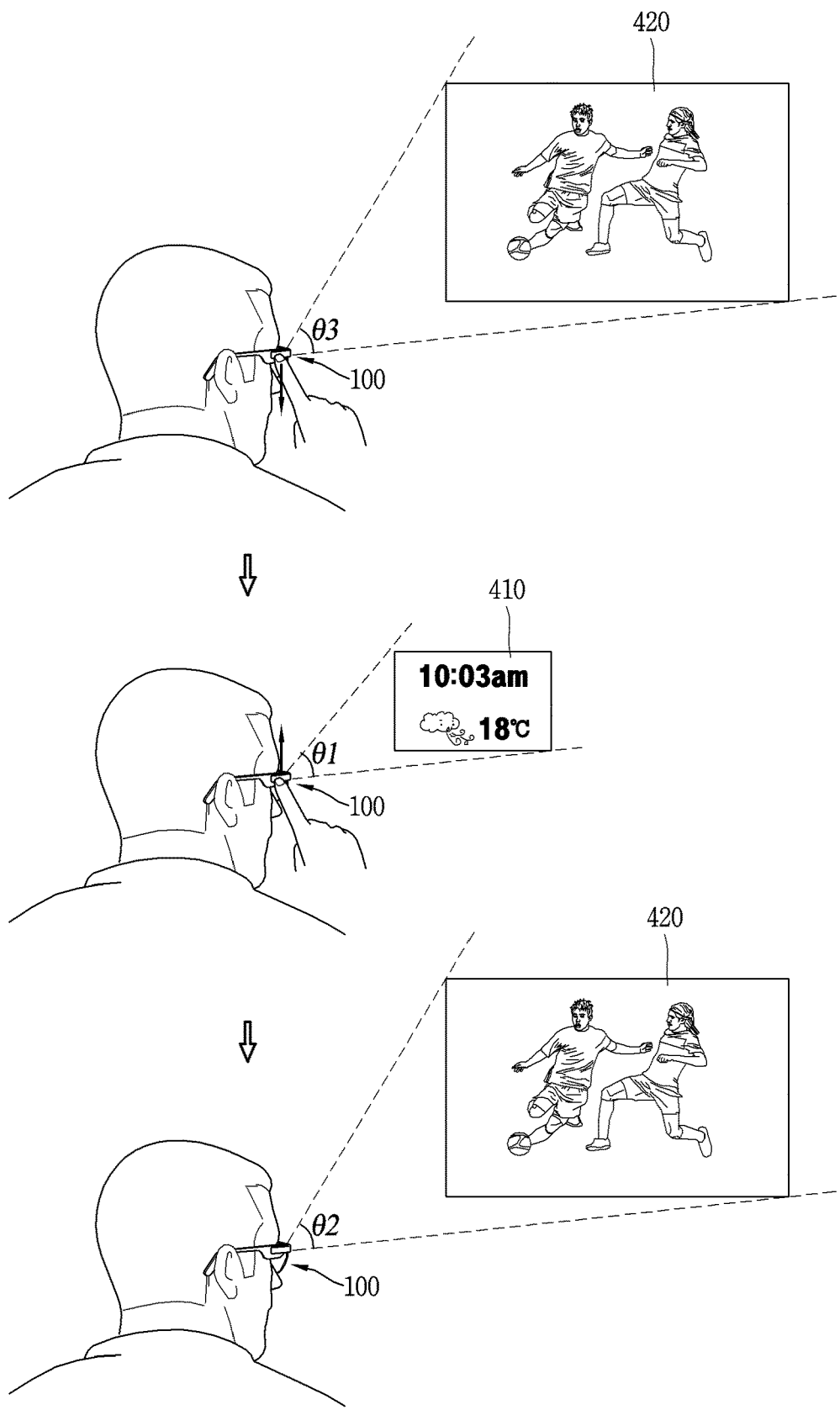

FIGS. 5A and 5B are conceptual views illustrating a control method of changing an operating mode.

Referring to FIGS. 2A, 3A, and 5A together with FIG. 4B, the controller 180 changes the operating mode based on a control command applied to the user input unit 123, 223.

An image of visual information is formed by the optical unit (S1200), and a touch input applied to the user input unit 123, 223 is received (S1300). For example, the user input unit 123, 223 may include a touch sensor for sensing a touch input.

The controller detects a direction of a touch input applied to the user input unit 123, 223 (S1310). For example, the controller may wait for a reception of a control command (touch) to control the image when a specific touch input applied to the user input unit 123, 223 is detected.

When the touch input is applied in a first direction, the controller changes the operating mode (S1410). Referring to FIG. 5B, in the second mode, the optical unit 130 displays the second image 420. The controller 180 switches the second mode to the first mode based on the touch input applied in the first direction. The first direction corresponds to a dragging or flicking touch input that the glass type terminal 100 is moved downward while being worn on the user's head.

The controller changes the visual information based on the touch input applied in the first direction (S1411). That is, when the mode is changed to the first mode, the display unit 151 switches the second visual information 320 to the first visual information 310. The controller 180 displays the first image 410 of the first visual information 310. In addition, the focal lengths of the first and second lenses 131 and 132 are changed based on the changed operating mode (S1511). Accordingly, the first image 410 is smaller than the second image 420 and is output at a position close to the user.

The controller 180 switches the first mode back to the second mode, in response to a touch input applied in a direction opposite to the first direction in the first mode. Accordingly, the controller 180 controls the display unit 151 and the optical unit to display the second image 420 again.

According to this embodiment, the user applies a control command to the user input unit to change a function executed in the glass type terminal, forms output visual information into an image of a different size according to the change of the function, and outputs the image on a different position. Accordingly, the user does not have to apply a separate control command for changing an output state of visual information corresponding to a function.

On the other hand, when the direction of the touch input is a second direction, the controller changes the focal lengths of the first and second lenses 131 and 132. Here, the second direction may correspond to a direction intersecting with the first direction. Referring to FIG. 5B, the touch input applied in the second direction corresponds to a dragging or flicking touch input that the glass type terminal is moved in an extending direction of the first and second frames 101 and 102 while being worn on the user's head. When the touch input is applied in the second direction, the display unit continuously outputs the visual information, and the focus length of the image of the visual information is changed based on the control of the optical unit. Accordingly, in the same operating mode, visual information is output in a different size and at a different position.

Figure 5C:
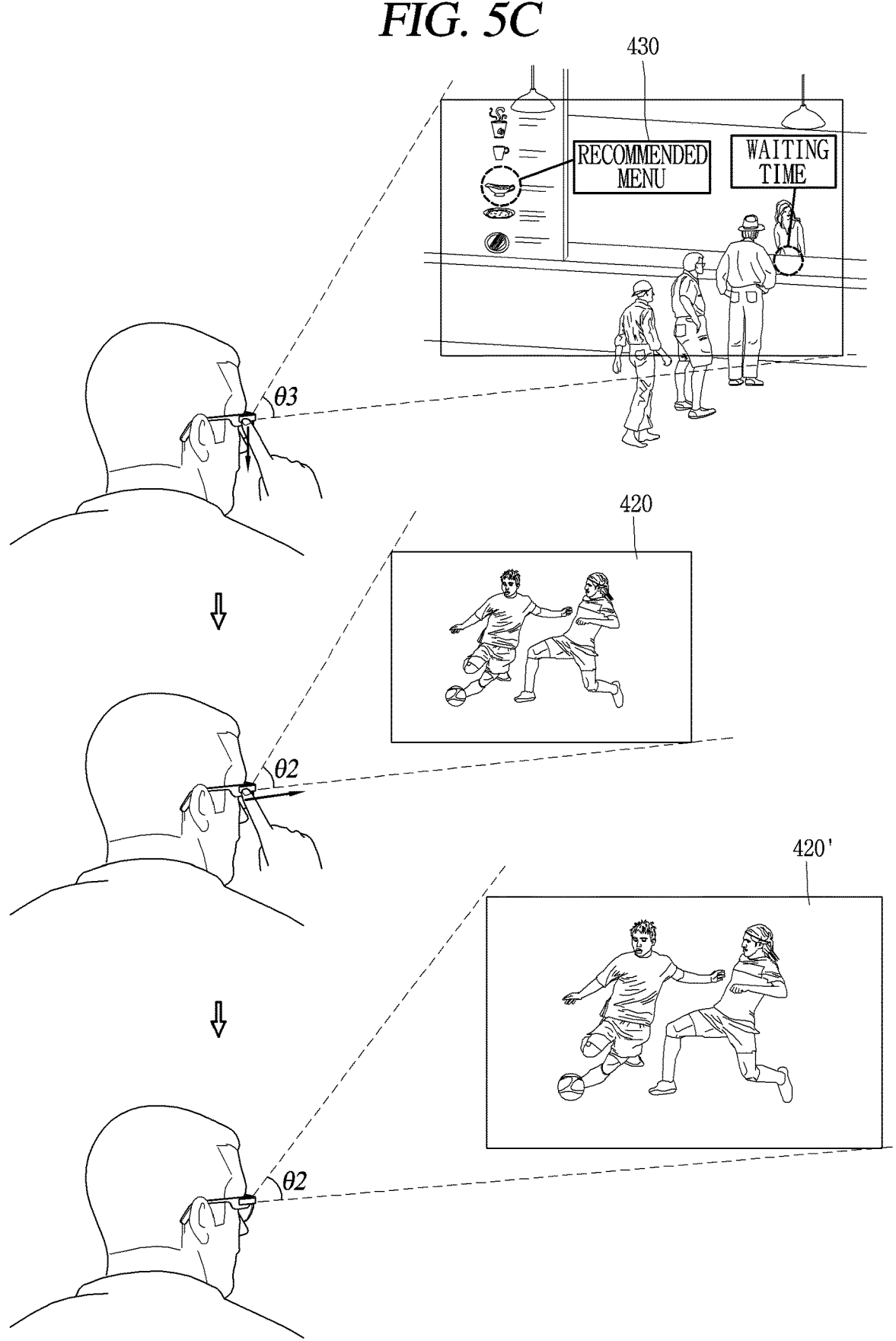

Referring to FIG. 5C, while the third image 430 is provided in the third mode, the controller 180 switches the third mode to the second mode based on the touch input applied in the one direction.

In the second mode, the display unit 151 and the optical unit 130 output the second image at a second angle of view θ2. The controller 180 controls the optical unit 130 to form an enlarged image 420' of the second image while maintaining the second angle of view θ2, in response to a touch input applied in another direction.

The touch input applied in the another direction may correspond to a dragging or flicking touch input that the glass type terminal is moved forward while being worn on the user's head. However, such touch input is not limited thereto.

Even if an enlargement control command is applied by the touch input applied in the another direction, the controller 180 maintains the second mode and the display unit 151 outputs the second visual information 320.

The controller 180 controls the optical unit 130 to increase the size of the second image 420 by changing the refractive rate of the first lens 131 and let the area in which the image is formed close to the user by changing the refractive rate of the second lens.

That is, the controller 180 may control a size and output position of an image to be changed while maintaining an activated mode based on a separate control command, thereby allowing the user to selectively adjust the size and output position of the image.

Figure 5D:
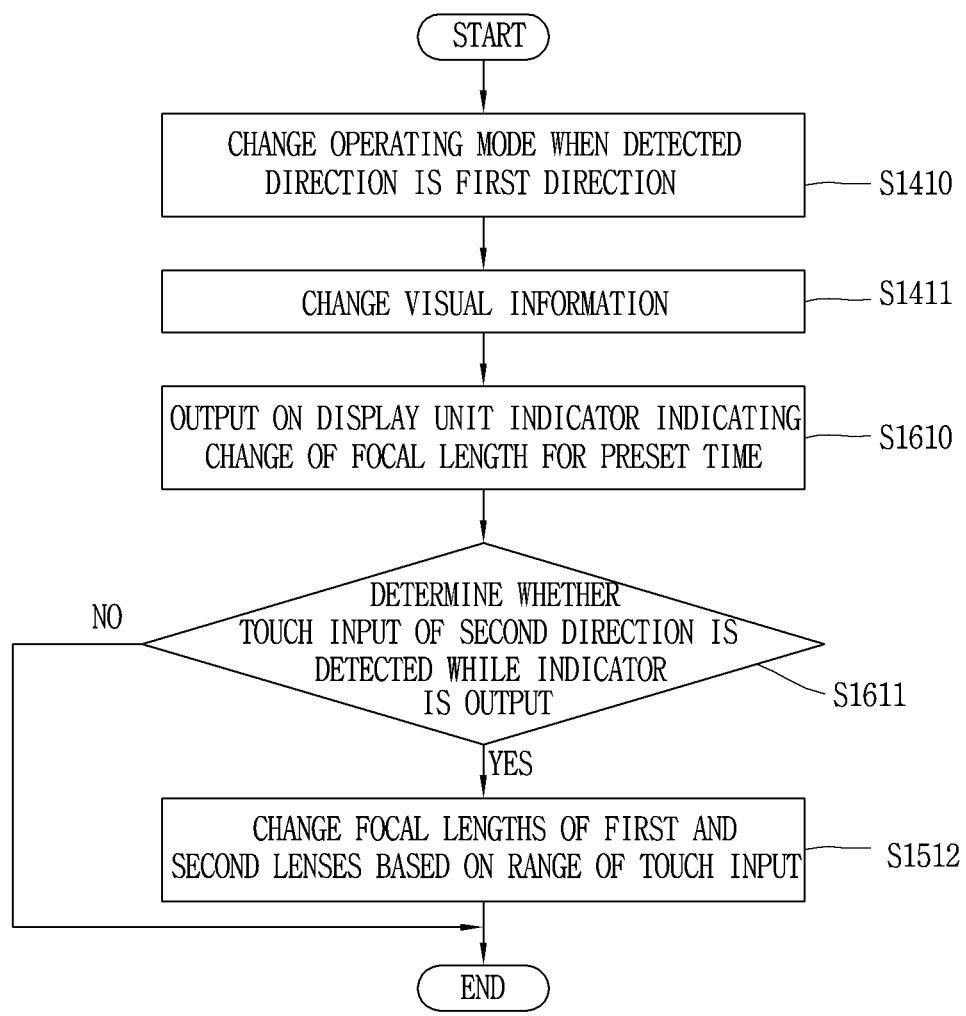

FIG. 5D is a flowchart illustrating a control method of a glass type terminal according to another embodiment of the present invention. Referring to FIGS. 5A and 5C, the operating mode is changed when the touch input is applied in the first direction, (S1410), and the visual information is changed to correspond to the changed operating mode (S1411). The controller 180 outputs an indicator indicating a change of a focal length on the display unit 151 for a preset time (S1610). The indicator overlaps one area of the changed visual information. The indicator may include information that the focal length can be changed, or may include an image that guides a direction of a touch input (the second direction) for changing the focal length. The indicator disappears after the preset time.

The controller 180 determines whether the touch input of the second direction is detected while the indicator is output (S1611). When the touch input of the second direction is detected while the indicator is output, the controller changes the focal lengths of the first and second lenses 131 and 132 based on a range of the touch input (S1512). The controller 180 controls the focal lengths to be changed much as the range of the touch input of the second direction increases.

Meanwhile, when the indicator disappears from the display unit, the controller may ignore a touch input applied to the user input unit. Accordingly, even if the touch input is applied in the second direction after the indicator disappears, the focal length of the image is not adjusted. That is, when a touch input is not received while the indicator is output, the controller may determine that the user wishes to receive the image at a current focal length and thus output the visual information as it is.

A control command (for example, a control of the volume), irrespective of the focal length, may be generated by the touch input applied in the second direction after the indicator disappears.

Figure 5E:
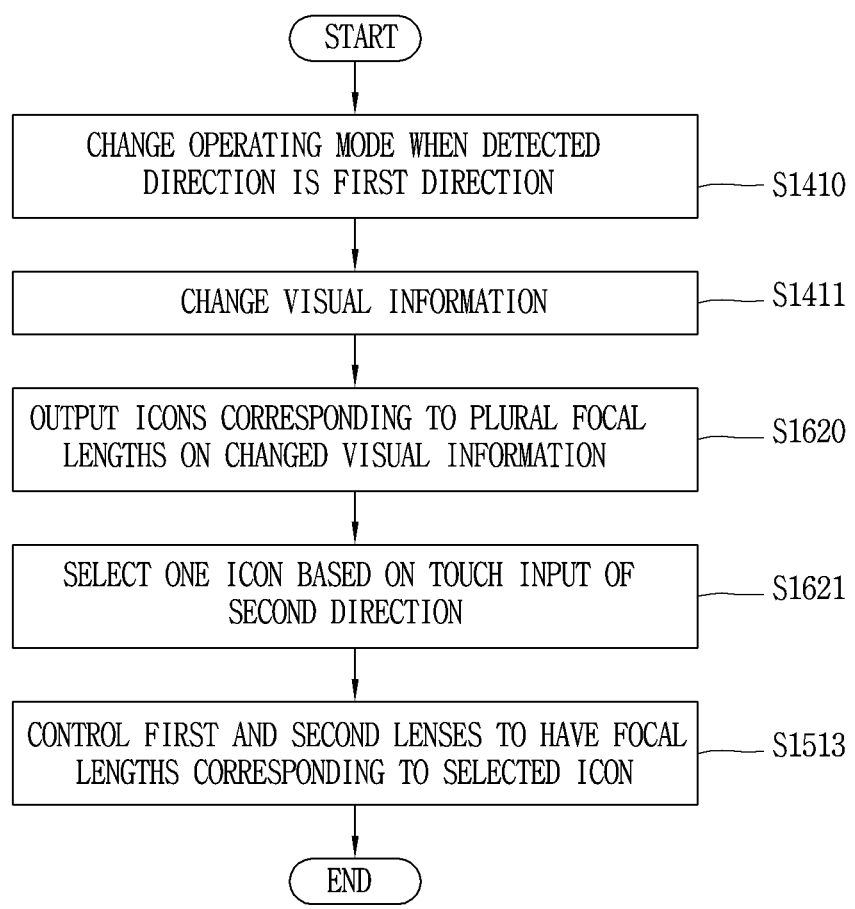

FIG. 5E is a flowchart illustrating a control method of a glass type terminal according to another embodiment of the present invention. The controller changes the operating mode by the touch input applied in the first direction (S1410), and changes the visual information accordingly (S1411).

The display unit 151 outputs a plurality of icons corresponding to a plurality of focal lengths on the changed visual information (S1620). The plurality of focal lengths correspond to discontinuous focal lengths formed by the first and second lenses 131 and 132. These may be selected according to a user setting, or may be set to an optimal state in which screen information output in each operating mode is imaged.

The controller 180 may select one of the plurality of icons based on the touch input applied in the second direction (S1621). For example, the display unit may transform (change) a shape of the selected icon. One of the plurality of icons sequentially arranged may be transformed based on a range of the touch input of the second direction, and the user may select the one icon based on an additional touch input. Alternatively, the display unit may control the optical unit in real time to correspond to the selected icon based on the touch input of the second direction.

The controller 180 controls the first and second lenses 131 and 132 to have focal lengths corresponding to the selected icon (S1513). Accordingly, the user can output visual information output in one operating mode as an image of a desired size at a desired position by applying different focal lengths. In addition, since a focal length suitable for outputting visual information is preset, the user can be provided with a higher quality image.

Figure 5F:
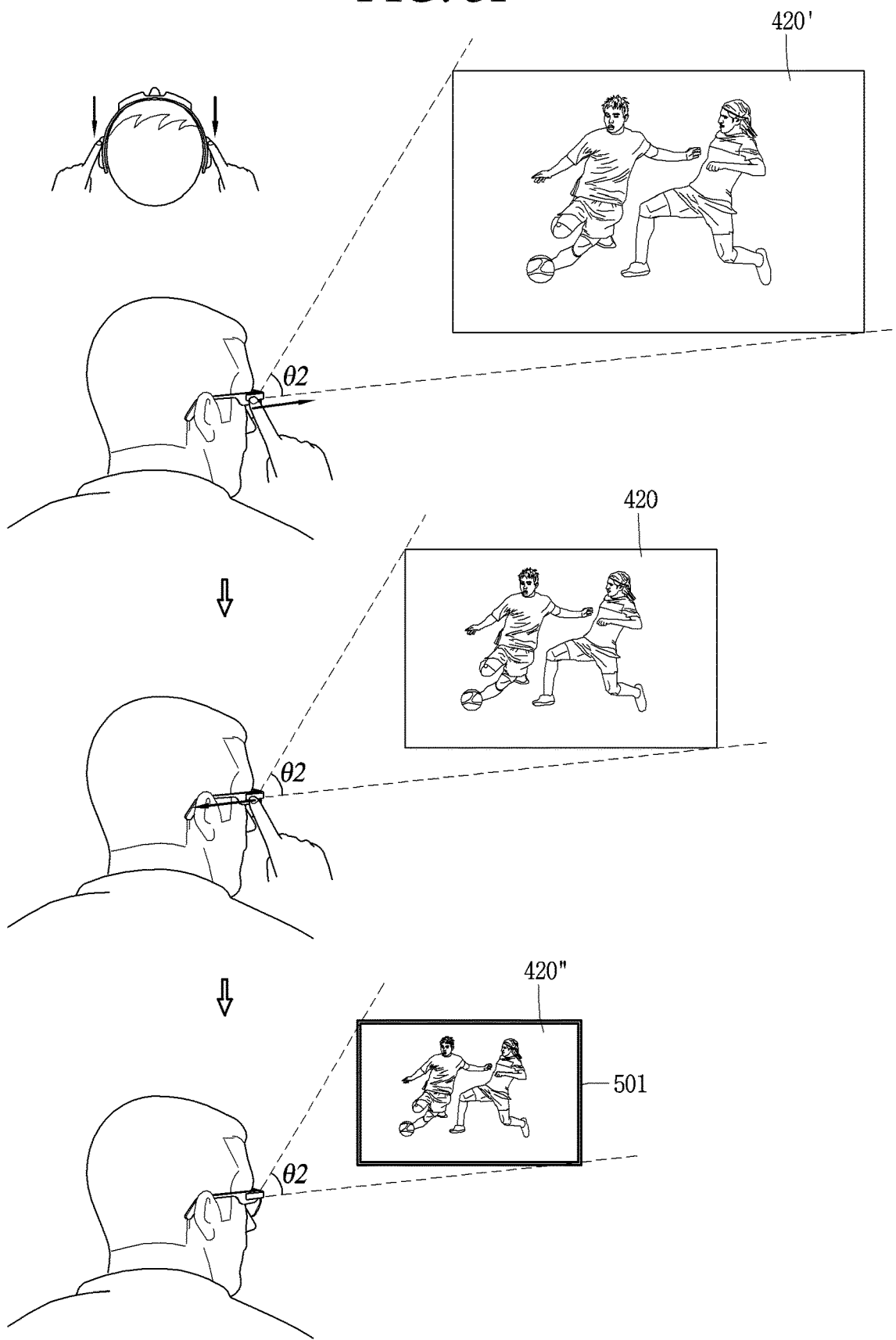

Hereinafter, a control method of changing a size of an image according to another embodiment will be described, with reference to FIG. 5F. The controller 180 gradually reduces a size of an image based on a specific touch input sensed by the user input unit 123, 223 and outputs the image to be gradually closer to the user.

For example, the specific touch input may correspond to a touch simultaneously applied to the first and second user input units 123a and 123b or 223a and 223b. The touch input may be set to a dragging touch input (or flicking touch input) that moves in one direction. When a touch input moving in an opposite direction is applied, the image is gradually enlarged and output to be gradually moved away from the user.

The operating mode is not changed by the specific touch input. The display unit 151 outputs the second visual information 320 while the specific touch input is applied after the second mode is activated.

The controller 180 controls the optical unit 130 to output the second image 420 from the enlarged image 420'. When the specific touch input is detected in the output state of the second image 420, the controller 180 changes the second image 420 to a reduced image 420". The reduced image 420" is output closer to the user than the second image 420.

The controller 180 controls the display unit 151 to output an indicator 501 indicating the change of the operating mode when the size or output position of the image changed based on the control command reaches a preset limit while a specific operating mode is activated. For example, in case where a maximum size and a minimum size of an image are preset to form visual information, which is output in the operating mode, into an image, when the image is changed to the minimum size or the maximum size by the specific touch input, the indicator 501 is output.

The indicator 501 may be formed along an edge of the reduced image 420", but the shape of the indicator is not limited thereto. Shapes of the indicators corresponding to the maximum size and the minimum size may be distinguished from each other. When a control command for reducing the size of the image is applied while the indicator is output, the controller may ignore the control command and continuously output the reduced image 420" of the minimum size.

According to this embodiment, the user can view a small screen closer or a larger screen farther by adjusting a size and output position of substantially the same image which is output in a state where the operating mode is not changed. Also, the maximum size and the minimum size of the image can be recognized by indicators.

FIGS. 6A to 6D are flowcharts illustrating a control method of changing a focal length according to a change of an operating mode.

Figure 6A:
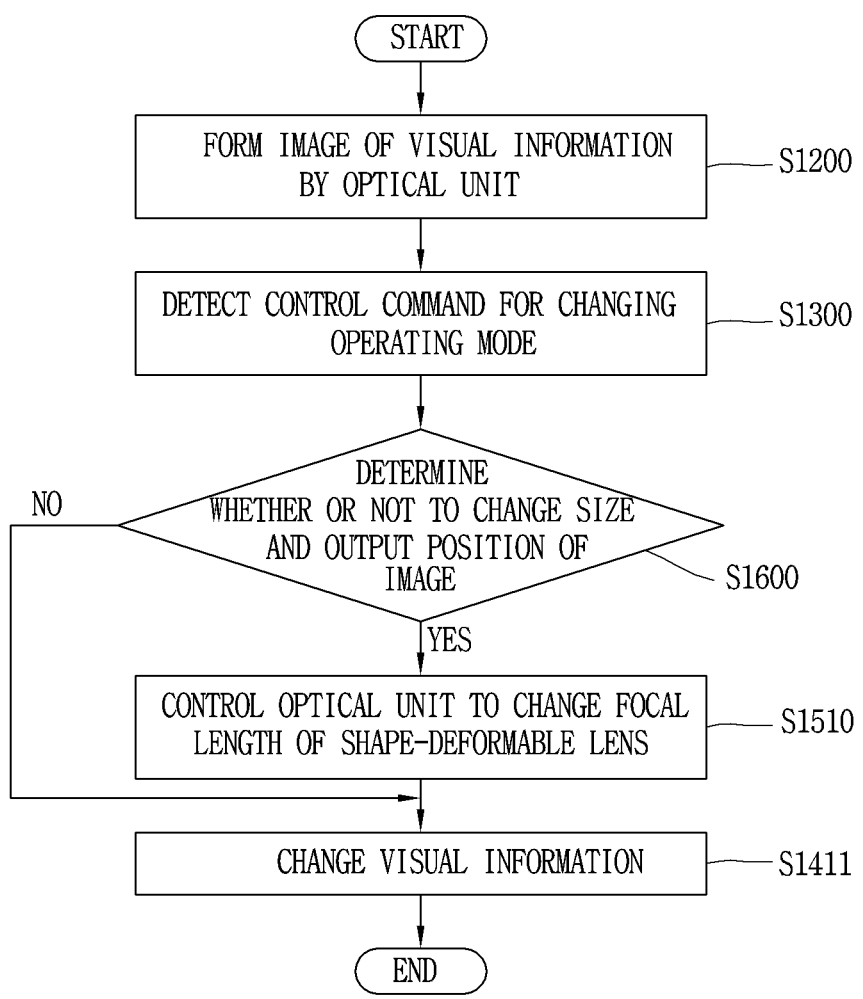
FIGS. 6A to 6D are flowcharts illustrating a control method of changing a focal length in accordance with a change of an operating mode.

Referring to FIG. 6A, an image of visual information is formed by the optical unit 130 (S1200), and a control command for changing an operating mode is detected (S1300). According to one embodiment, the controller further determines whether or not to change size and output position of the image (S1600).

Based on the control step, the controller changes only the visual information (S1411), or changes the visual information after controlling the optical unit 130 to change the focal lengths of the shape-deformable lens (the first and second lenses 131 and 132) (S1510).

The determining whether or not to change the size and output position of the image may be executed based on an additional control command input by a user, a type of visual information output, a current state of the user, and a current state (position, time, date, etc.) of the glass type terminal. Hereinafter, detailed embodiments will be described.

Figure 6B:
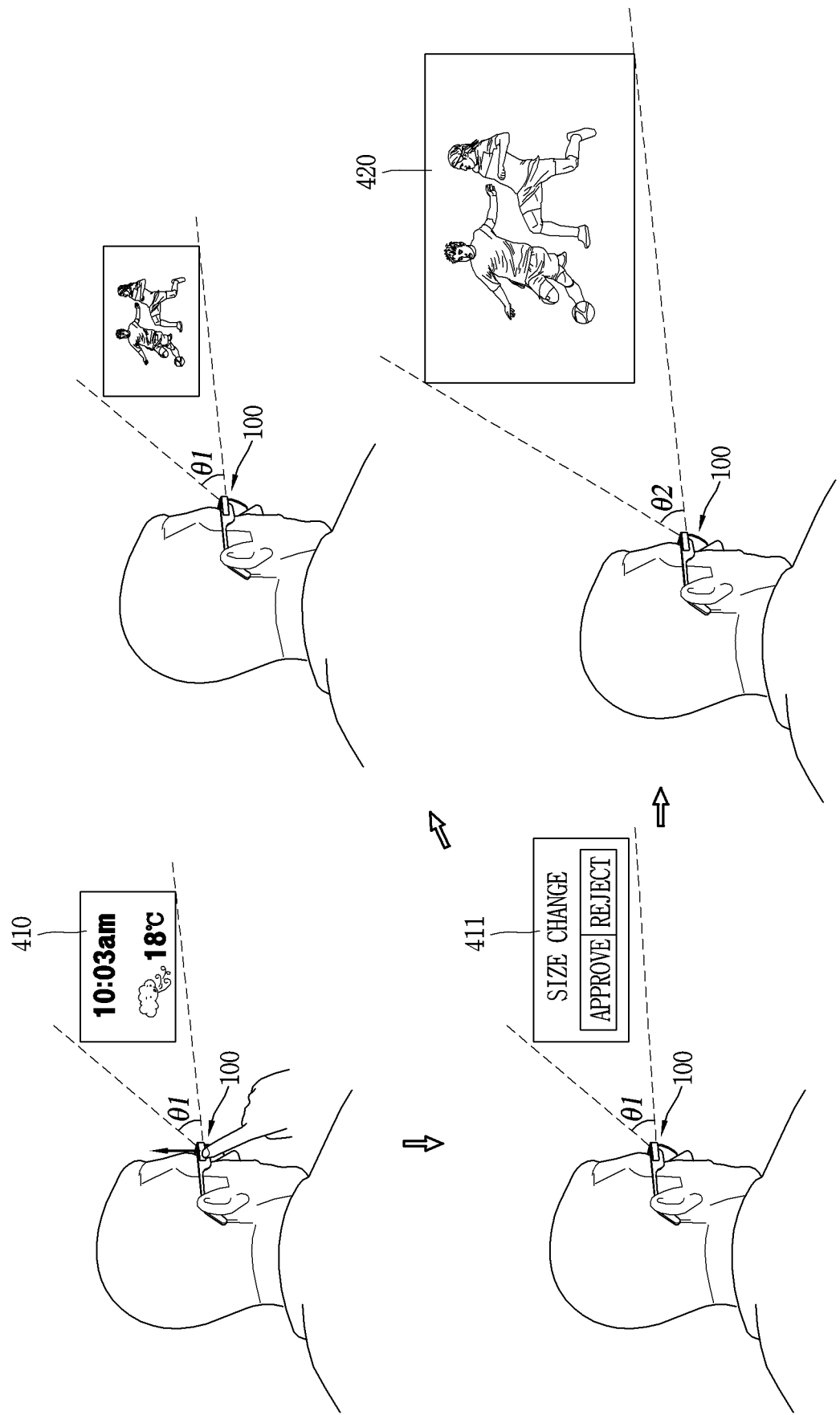

FIG. 6B is a conceptual view illustrating a control method of a glass type terminal in accordance with one embodiment. The first image 410 is output at the first angle of view θ1. The controller switches the operating mode from the first mode to the second mode based on the touch input applied in the first direction. The controller controls the display unit to output a notification window 411 for confirming the change of the size and output position of the image. The controller may determine the size and output position of the displayed image according to a gesture detected by the notification window 411.

For example, the controller controls the display unit 151 and the optical unit 130 to display the second image 420 when the change of the size and position is approved.

Alternatively, the controller controls the display unit 151 to output the second visual information in the size of the first image when a gesture for rejecting the change of the size and position is applied. In this case, even if the operating mode is changed, the focal lengths of the first and second lenses 131 and 132 are not changed.

Accordingly, even if different visual information is output according to the change of the operating mode, the user can select a change of an output state of an image.

Figure 6C:
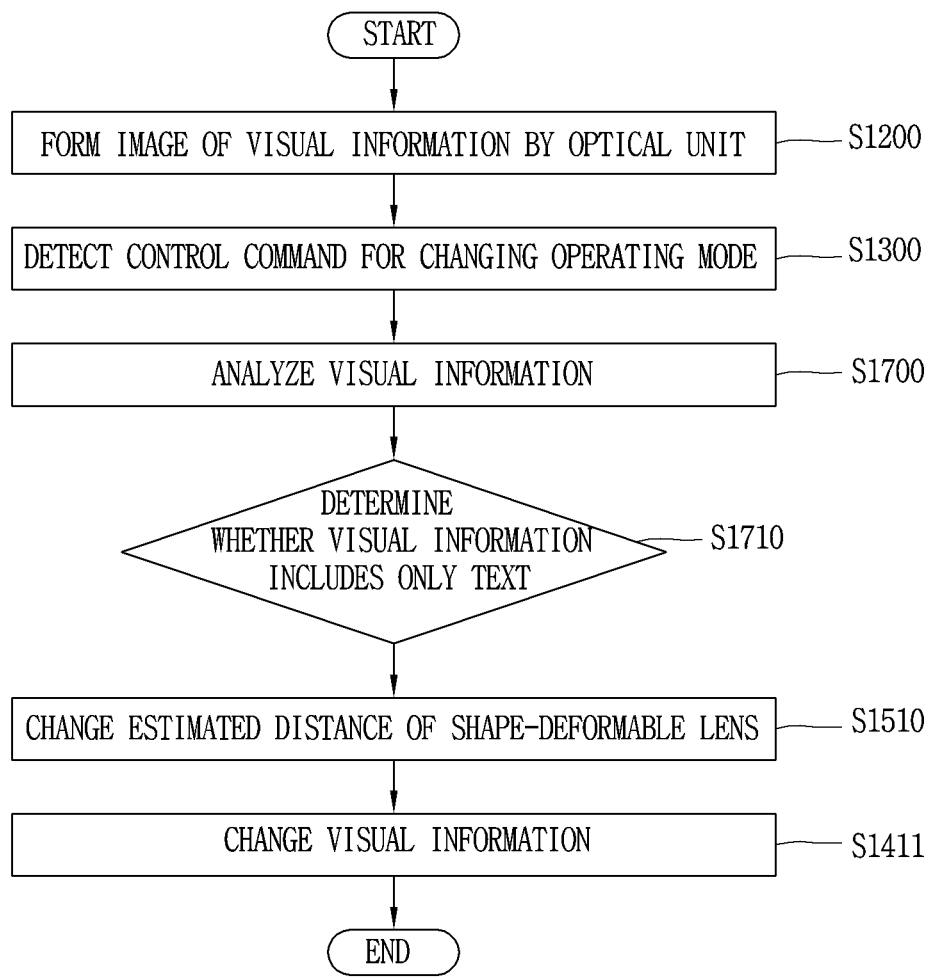

Referring to FIG. 6C, an image of visual information is formed by the optical unit 130 (S1200), and a control command for changing the operating mode is detected (S1300). The controller 180 analyzes changed visual information according to a changed operating mode (S1700). The controller 180 determines whether the visual information is text only (S1710). For example, the controller 180 may determine whether the visual information corresponds to an e-book, a web page, a mail list, or the like which is in a text form. When the visual information is not formed only of text, the visual information may correspond to a video reproduced, a captured or stored image, a web page including photos or the like, a home screen page including icons or the like, and the like.

When the visual information includes other visual data in addition to text, the controller changes the focal length of the shape-deformable lens (S1510), and outputs the visual information changed based on the operating mode (S1411).

On the other hand, when the visual information includes only text, the controller 180 outputs the changed visual information while maintaining a current focal length. According to this embodiment, whether or not to change the focal length may be determined by analyzing the visual information to be changed. The foregoing description has been given of the example of determining whether to change a focal length based on whether a document includes only text, but the present invention is not limited to this. For example, it may be possible to analyze whether or not auditory data is output together with the visual information, the number of pixels constituting the visual information, a function of the visual information, and whether a selectable icon is included in the visual information.

Figure 6D:
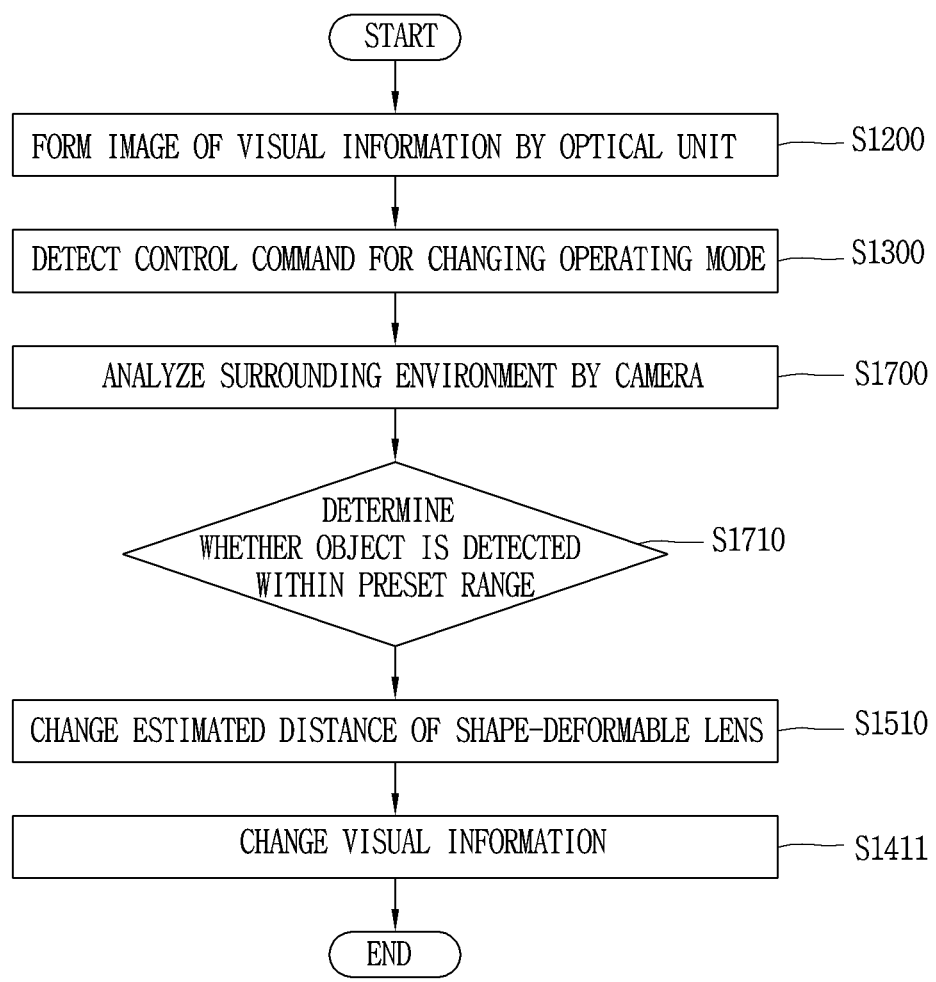

Referring to FIG. 6D, the image of the visual information is formed by the optical unit 130 (S1200), and a control command for changing the operating mode is detected (S1300). The controller 180 analyzes a surrounding environment by the camera 121 (S1800). The controller 180 determines whether an object is detected within a preset range according to the surrounding environment (S1810). Here, the object refers to everything that is disposed around the user, and a type is irrelevant. The preset range may be related to an output position of the image.

When the object is detected within the preset range, the controller 180 controls the optical unit 130 to change the focal length of the shape-deformable lens. That is, when another object is detected in the user's surrounding area, the focal length may be adjusted so that the output of the image is not disturbed by the another object. After the optical unit is controlled, the visual information is changed (S1411).

On the other hand, when other objects are not detected in the user's surrounding area, the visual information is changed while maintaining a current focal point.

However, the controller may perform a different control according to a function of the visual information. For example, when the visual information should be output in a manner of overlapping another object, the controller may control the optical unit according to a specific mode, irrespective of presence or absence of the object.

Figure 7A:
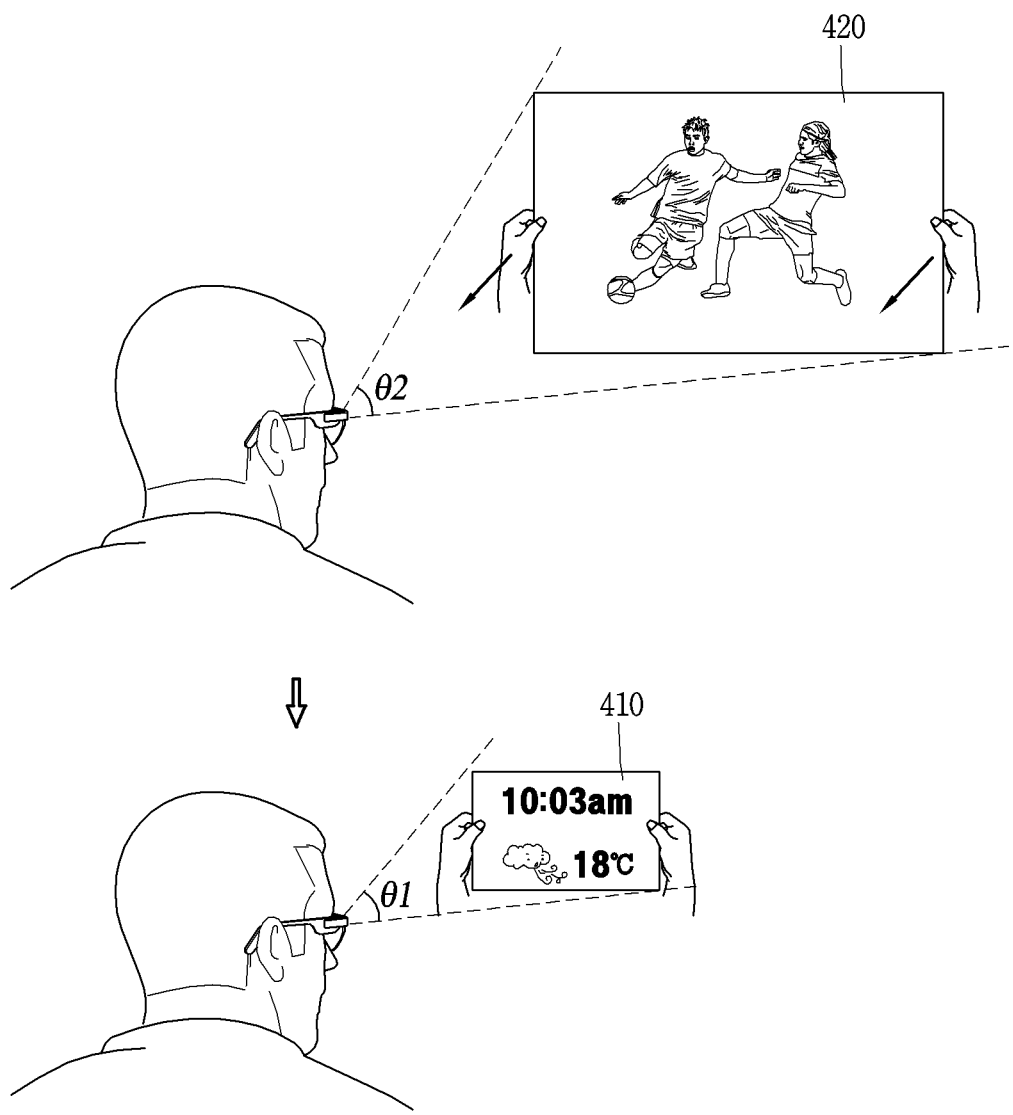
FIGS. 7A to 7C are conceptual views illustrating a control method of adjusting a size of an image provided in the same mode.
Figure 7B:
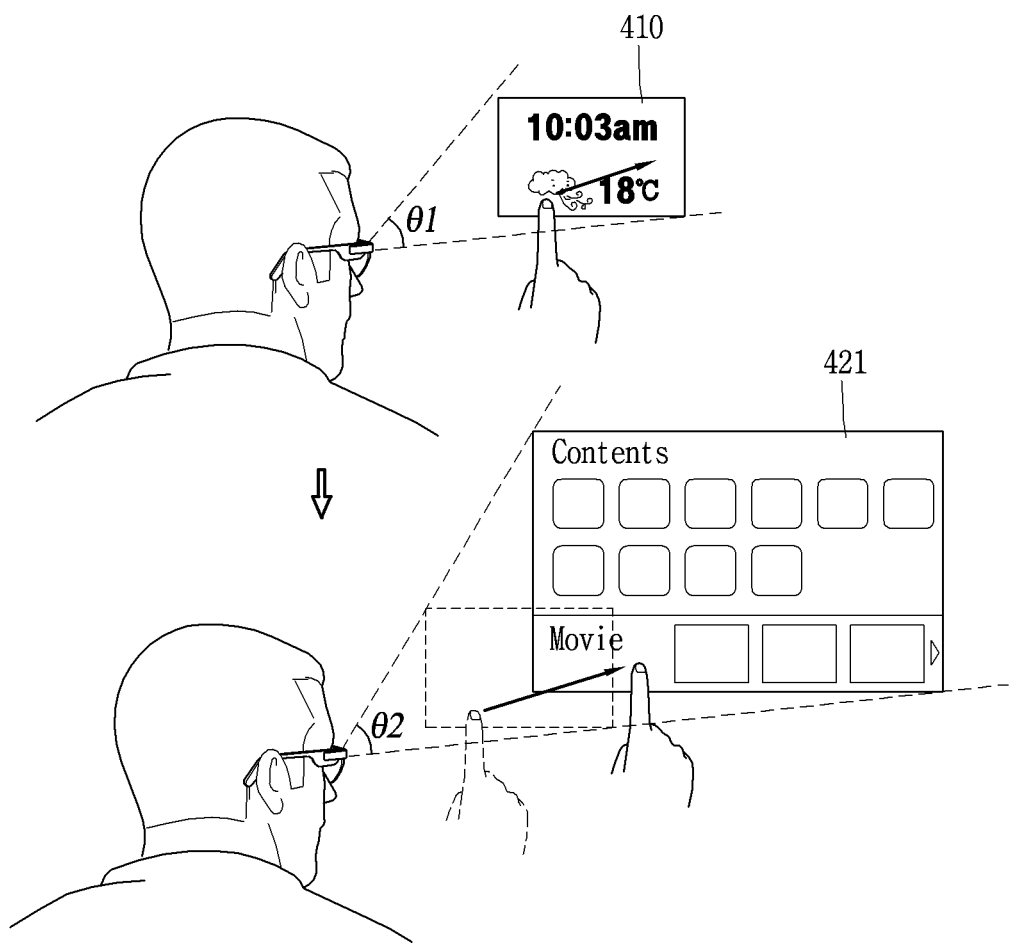
Figure 7C:
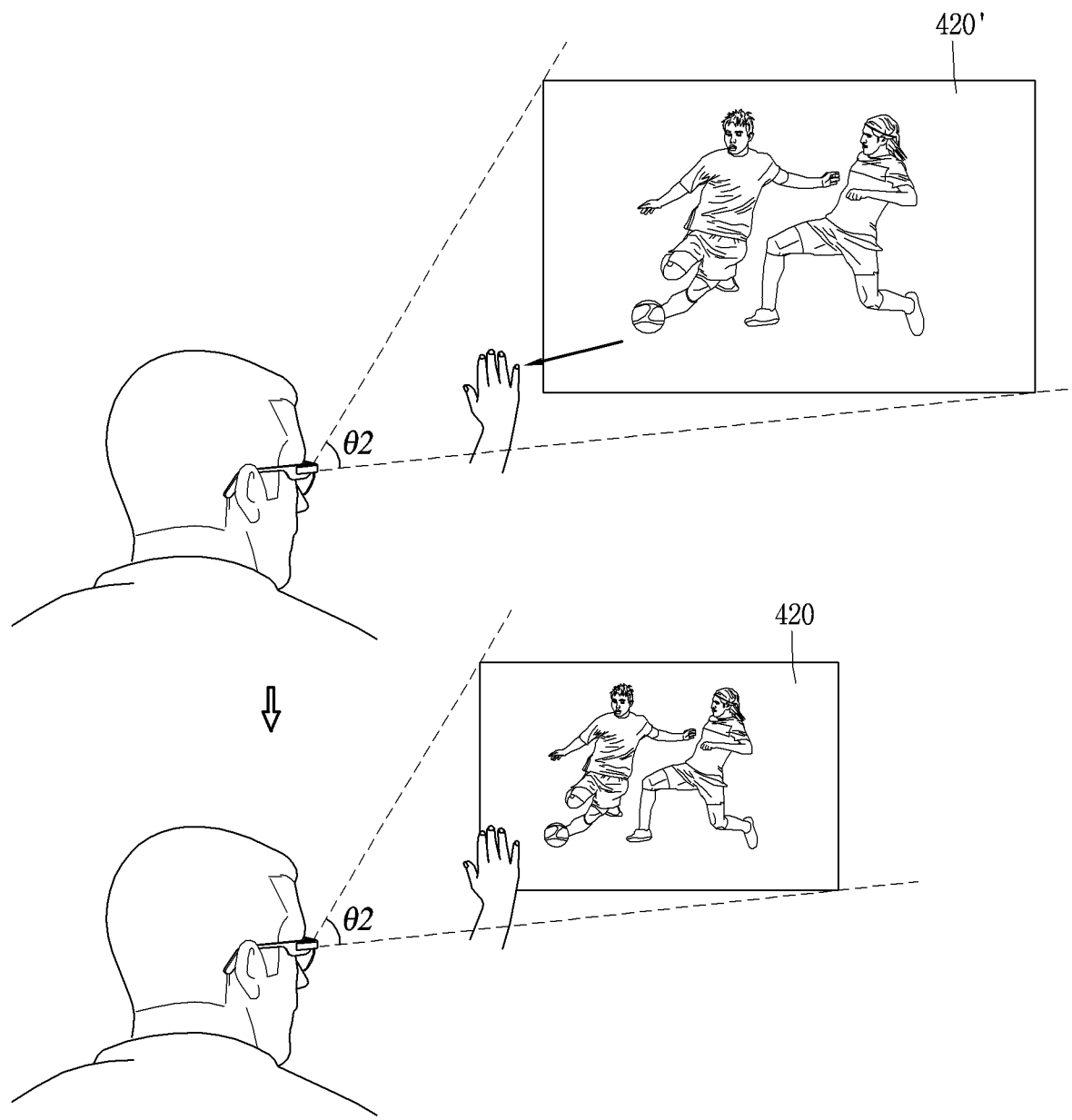

FIGS. 7A to 7C are conceptual views illustrating a control method by a gesture.

Hereinafter, a control method of changing an operating mode by a gesture will be described with reference to FIG. 7A. The glass type terminal 100 according to this embodiment further includes a gesture sensing unit (not illustrated) for detecting a gesture made by the user's hand. For example, the gesture may be detected by the camera 121, and the controller 180 may control the glass type terminal by generating a control command based on the detected gesture.

In the second mode, while the second image 420 is output, the gesture sensing unit may detect the user's hand that overlaps an edge of the second image 420 to change the second mode to the first mode.

For example, the gesture may correspond to moving the user's hand(s) overlapping the edge of the second image 420 toward the glass type terminal. When the user's hand(s) moves after the hand(s) is detected on a part of the edge of the second image 420, such gesture may be formed (recognized, determined) as a control command for changing the operating mode from the second mode to the first mode. Further, the shape of the hand(s) may correspond to a shape similar to holding a paper.

When a distance between the hand(s) and the glass-type terminal is less than a preset reference distance, the controller 180 switches the second mode to the first mode. The controller 180 thus controls the display unit 151 and the optical unit 130 to switch the second image 420 to the first image 310.

Also, the first image 410 may be output in an area adjacent to the user's hand(s).

Although not illustrated, the controller 180 may control the optical unit 130 and the display unit 151 to switch the second mode to the third mode when a gesture moving away from the glass type terminal is detected.

Referring to FIG. 7B, the controller 180 switches the first mode to the second mode when another type of gesture is detected. For example, in the activated state of the first mode, the another type of gesture may correspond to that a finger overlapping the first image 410 moves away from the glass type terminal.

The controller 180 activates the second mode based on the another type of gesture, and controls the display unit 151 and the optical unit 130 to output a second image 421 according to the second mode. The second image 421 may correspond to a home screen page including a plurality of contents for executing specific functions.

Although not illustrated in detail, when the first mode is switched to the second mode by a specific gesture, the controller 180 may selectively execute one of a plurality of functions included in the second mode according to a shape of the gesture.

Hereinafter, a control method of changing a size and output position of an image by a gesture will be described with reference to FIG. 7C.

An enlarged image 420' of second visual information 320 which is output on the display unit 151 is displayed while the second mode is executed. The controller 180 controls the optical unit 130 to reduce the size of the enlarged image 420' based on a detected user gesture, and output the second image 420 at a changed output position.

For example, the gesture may correspond to a palm shape detected at a specific position. When the gesture of the palm shape is detected at the specific position, the controller 180 displays the second image 420 corresponding to the second visual information 320 in an area where the palm is located. The output position of the image of the second visual information 320 may be gradually moved toward the position of the palm, and the user may stop the gesture while the output position of the image is moved.

Alternatively, when the gesture of the palm is detected for a preset time, the controller 180 recognizes the position of the palm and controls the optical unit 130 to output the image at the position.

According to this embodiment, an image can be displayed in a desired area by applying a gesture while maintaining an activated mode.

Figure 8A:
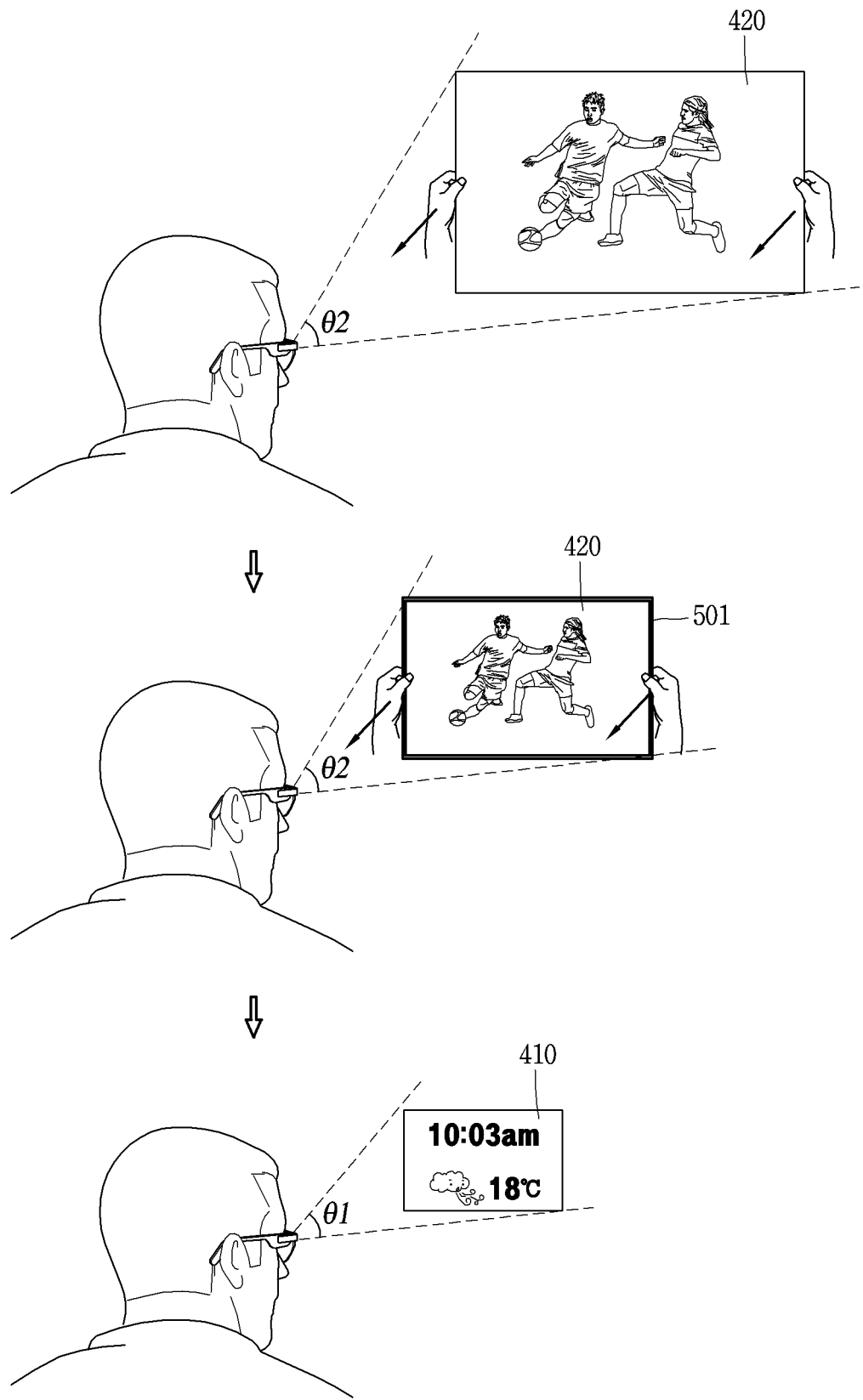
FIGS. 8A and 8B are conceptual views illustrating a control method by a gesture in accordance with another embodiment.
Figure 8B:
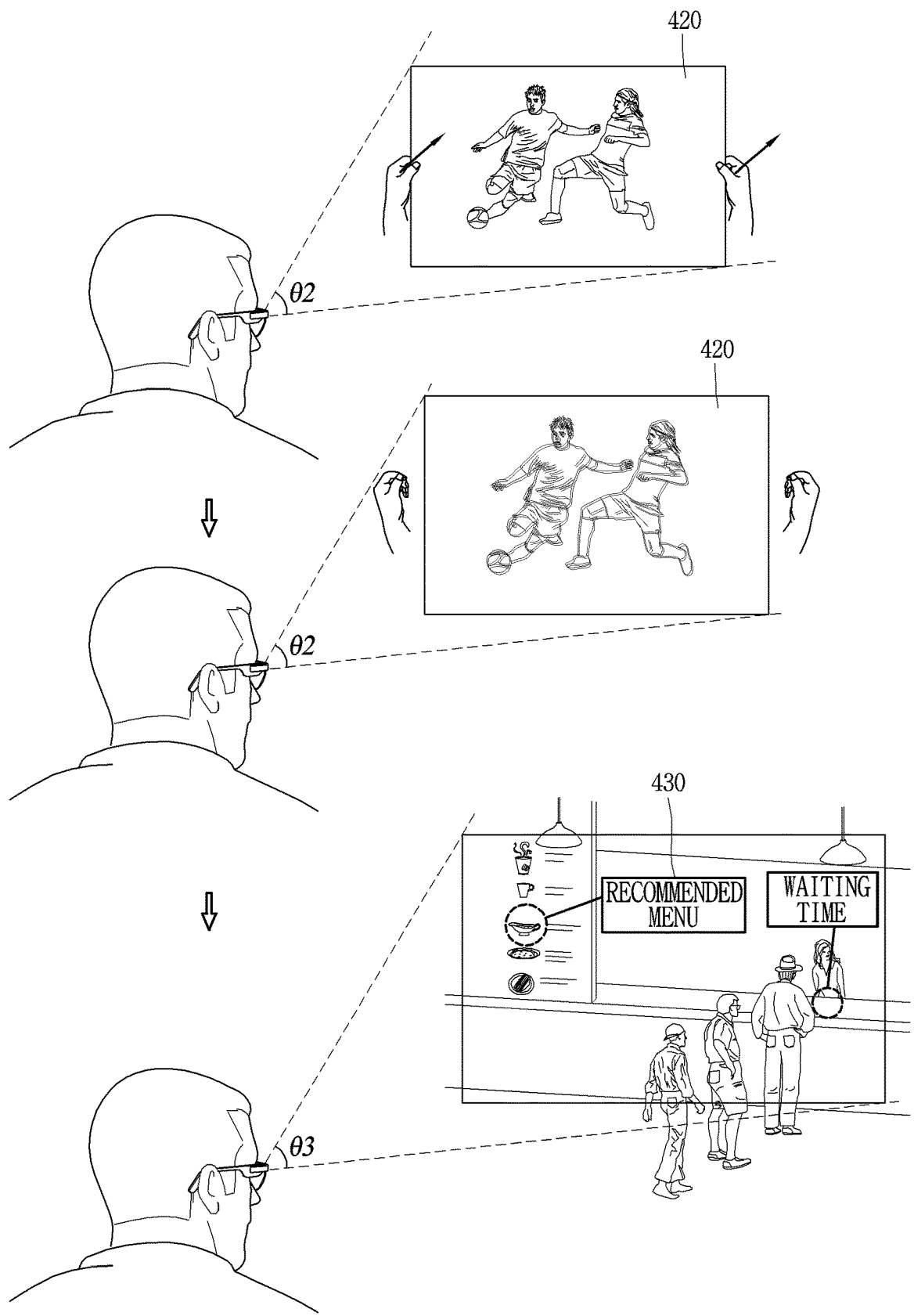

FIGS. 8A and 8B are conceptual views illustrating a control method by a gesture according to another embodiment.

Referring to FIGS. 7A and 8A, the controller 180 controls the optical unit 130 to output the second image 420 to gradually move close to the glass type terminal while its size is gradually reduced, based on a gesture that the hand overlapping the edge of the second image 420 moves toward the glass type terminal in the second mode.

The display unit 151 outputs the indicator 501 when the image is output in a minimum size in the second mode.

The controller 180 switches the second mode to the first mode when a gesture that the hand approaches is detected in a state where the indicator 501 is output. When the operating mode is switched to the first mode, the controller 180 controls the display unit 151 to switch the second screen information 320 of the second image 420 to the first screen information 320. That is, the controller 180 changes the mode when the gesture is continuously detected in a state where the image is output in the minimum size in the corresponding mode.

According to this embodiment, a size and output position of an image can be changed based on substantially the same gesture, and an operating mode can be switched to a mode corresponding to the changed size of the image, thereby enabling an intuitive control.

Referring to FIG. 8B, the controller 180 may activate the third mode when the detected shape of the hand which is detected in an overlapped state with the second image is changed in the second mode. For example, the controller 180 activates the third mode when the shape of the hand holding the second image is changed to a shape of a hand which is gradually moved farther and then unholds the second image.

When the third mode is activated, the second image 420 is changed to a third image 430 having a larger shape. An output position of the third image 430 corresponds to an area farther from the output position of the second image 420.

FIGS. 9A and 8B are conceptual views illustrating a control method of controlling a function in an activated state of an operating mode. The second image 421 is output in the second mode. The second image 421 may include a plurality of contents corresponding to executable functions.

The controller 180 may execute any one of the plurality of functions when a gesture in a shape of a finger is detected. When the finger is held for a preset time, the controller 180 detects it as a control command and executes a function of a content overlapping the finger.

Alternatively, when the finger moves away from a specific position, the controller 180 may detect it as a control command to execute a function of a content overlapping the specific position.

Although not illustrated, the display unit 151 may output a cursor in an area corresponding to the finger.

The controller 180 executes the function based on the gesture, and controls the display unit 151 to output screen information corresponding to the function. When a gesture moving away from a specific position is detected, the controller 180 outputs an execution image 420, which corresponds to the second screen information, in a shape larger than the second image 421. Also, the execution image 420 may be displayed in an area farther than the output position of the second image 421, from the glass type mobile terminal.

According to this embodiment, the controller 180 can execute a function in the same mode based on a gesture and change a position of an execution screen of the function.

Figure 9B:
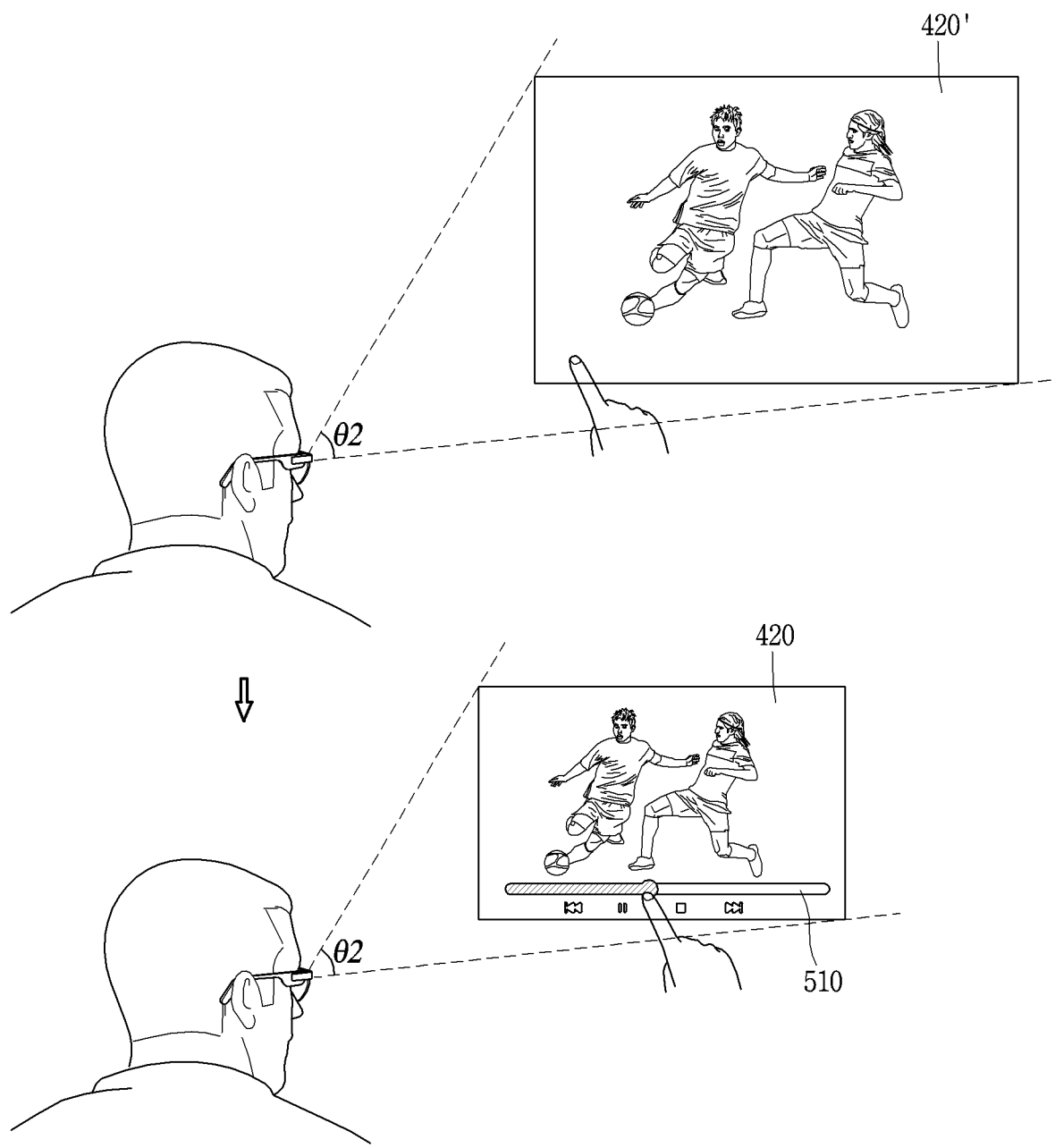

Referring to FIG. 9B, the second image 420 is output in the second mode. The controller 180 controls the display unit 151 to output a control icon 510 associated with the second image 420 when a gesture applied on the second image 420 is detected.

In addition, the controller 180 controls the optical unit 130 to display the second image 420 to be adjacent to a detected area of the gesture, together with the control icon 510.

According to this embodiment, when the second image is displayed in an area relatively far from the user, the output position of the control icon 510, which is used for controlling the second image, can be adjusted based on a gesture. Although not illustrated, when the control using the control icon is terminated, the controller 180 may control the optical unit 130 to output the second image at its original position again.

Figure 9C:
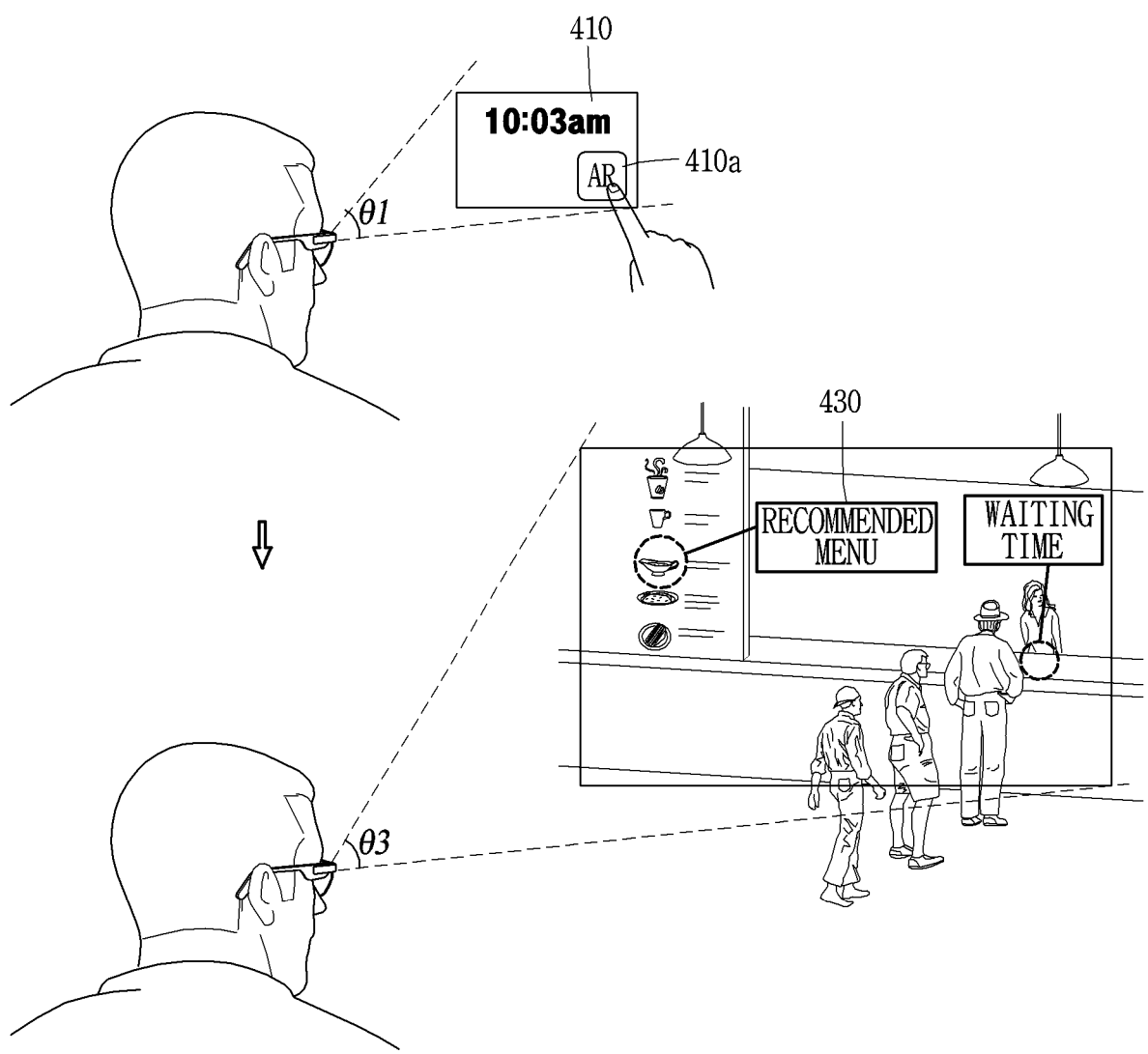

Hereinafter, a control method of changing a mode based on an execution icon output on an image will be described with reference to FIG. 9C. In the first mode, the first image 410 includes an execution icon 410a for executing an augmented reality function.

The controller 180 activates a third mode for executing the augmented reality function based on a gesture detected in an overlapped state with the execution icon 410a. The controller 180 controls the display unit 151 and the optical unit 130 to output the third image 430.

According to this embodiment, when an icon is included in an image, an operating mode can be changed according to a detected gesture.

Figure 10A:
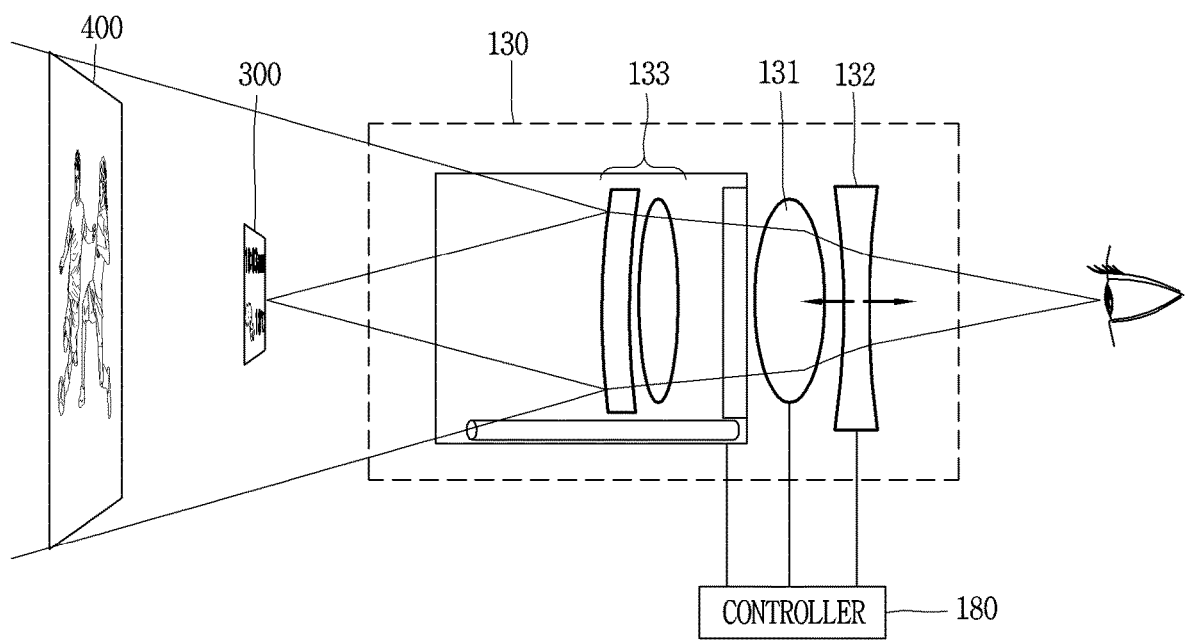
FIGS. 10A and 10B are conceptual views illustrating an image control method by a second lens.
Figure 10B:
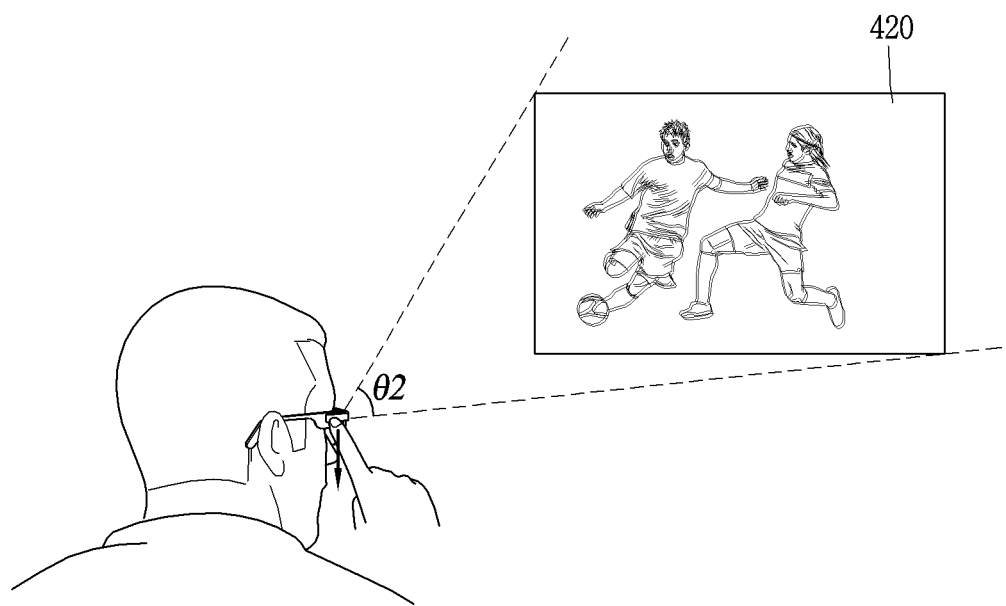
Figure 10B:
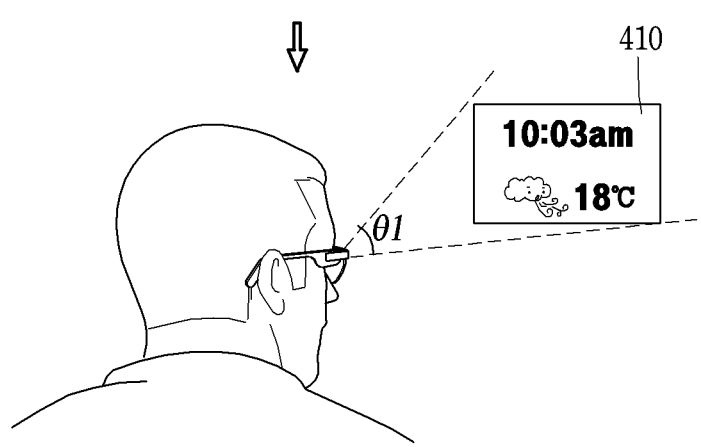

FIGS. 10A and 10B are conceptual views illustrating an image control method by a second lens. The position of the second lens according to this embodiment is configured to be variable along an optical axis. When a gesture of changing the mode is detected, the controller 180 may move the second lens such that the image is displayed in a blurred manner.

When the second lens is moved, a position where the image is formed is changed, and the user recognizes the image as an image out of focus. The controller 180 provides the blurred second image 420 for a preset short time and switches the second mode to the first mode so as to switch the second image 420 to the first image 410.

According to this embodiment, a visual effect that a mode change is continuously executed in a manner that the first image 410 is output while the first image 410 disappears can be provided.

Figure 11A:
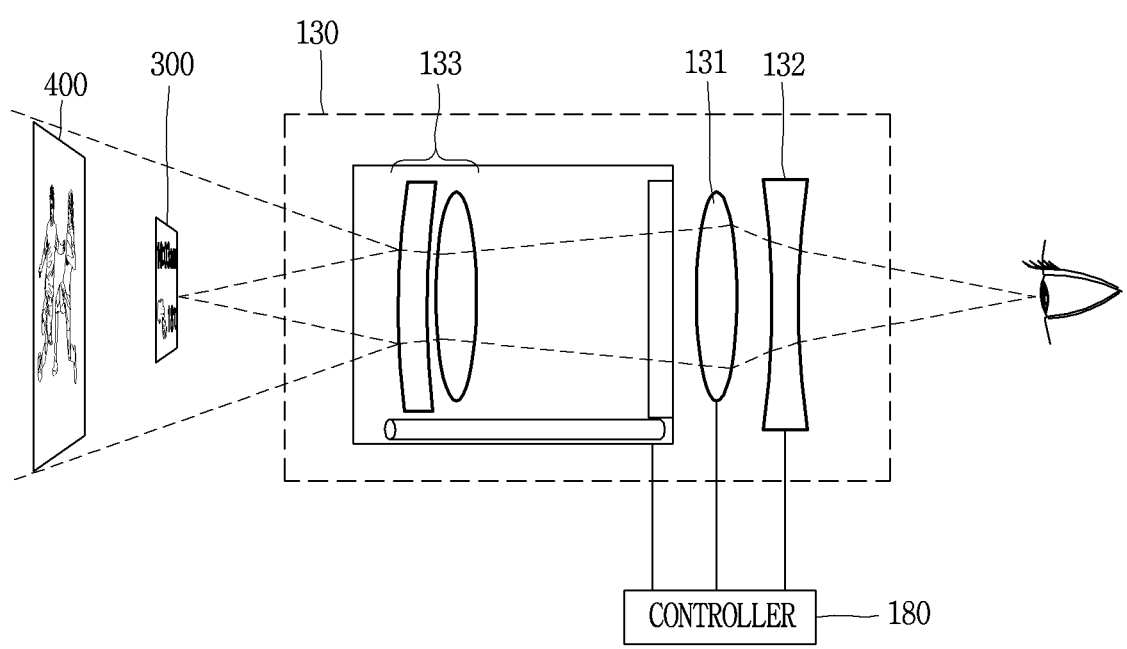
FIGS. 11A to 11C are conceptual views illustrating a control method of enlarging and reducing an image.
Figure 11B:
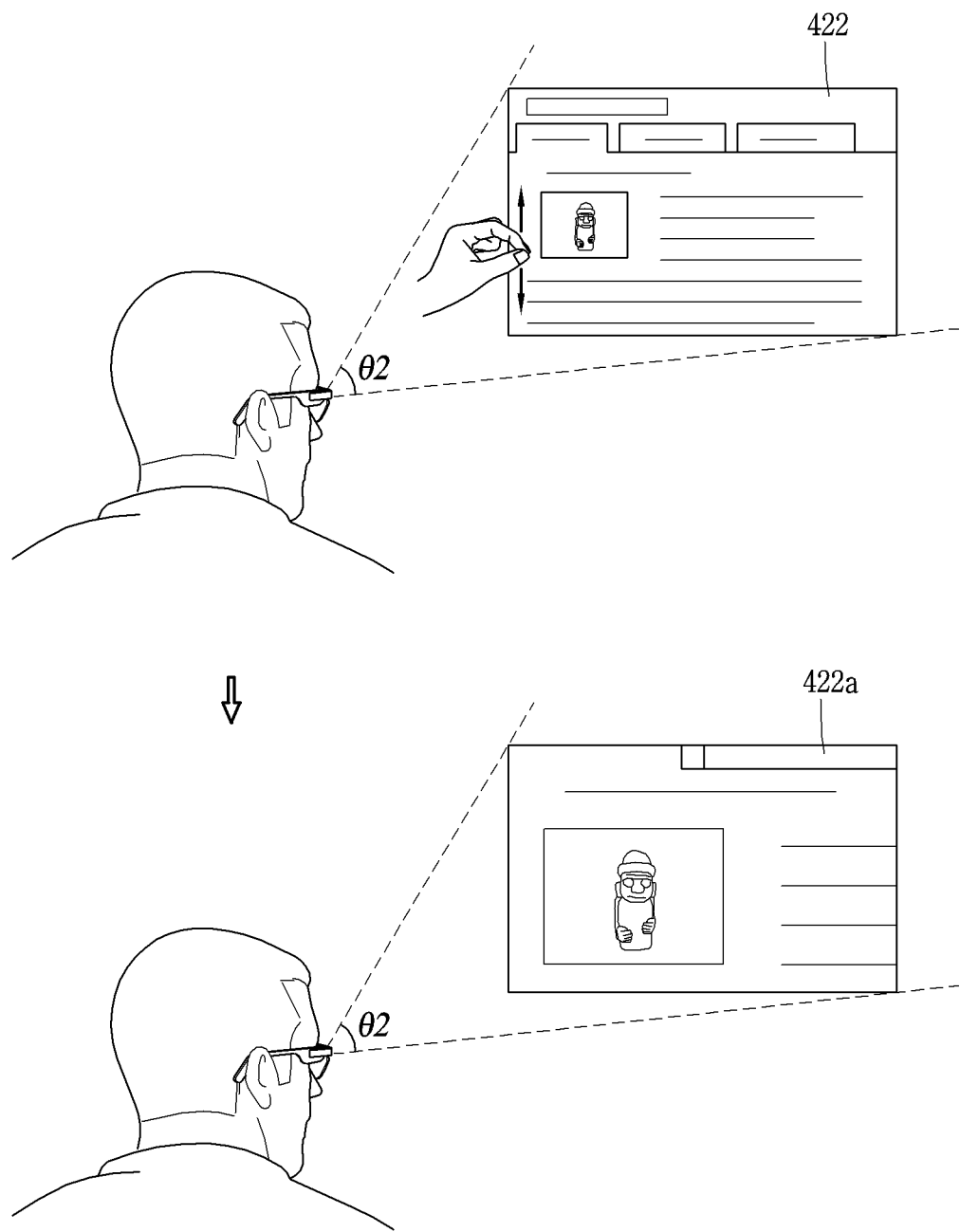
Figure 11C:
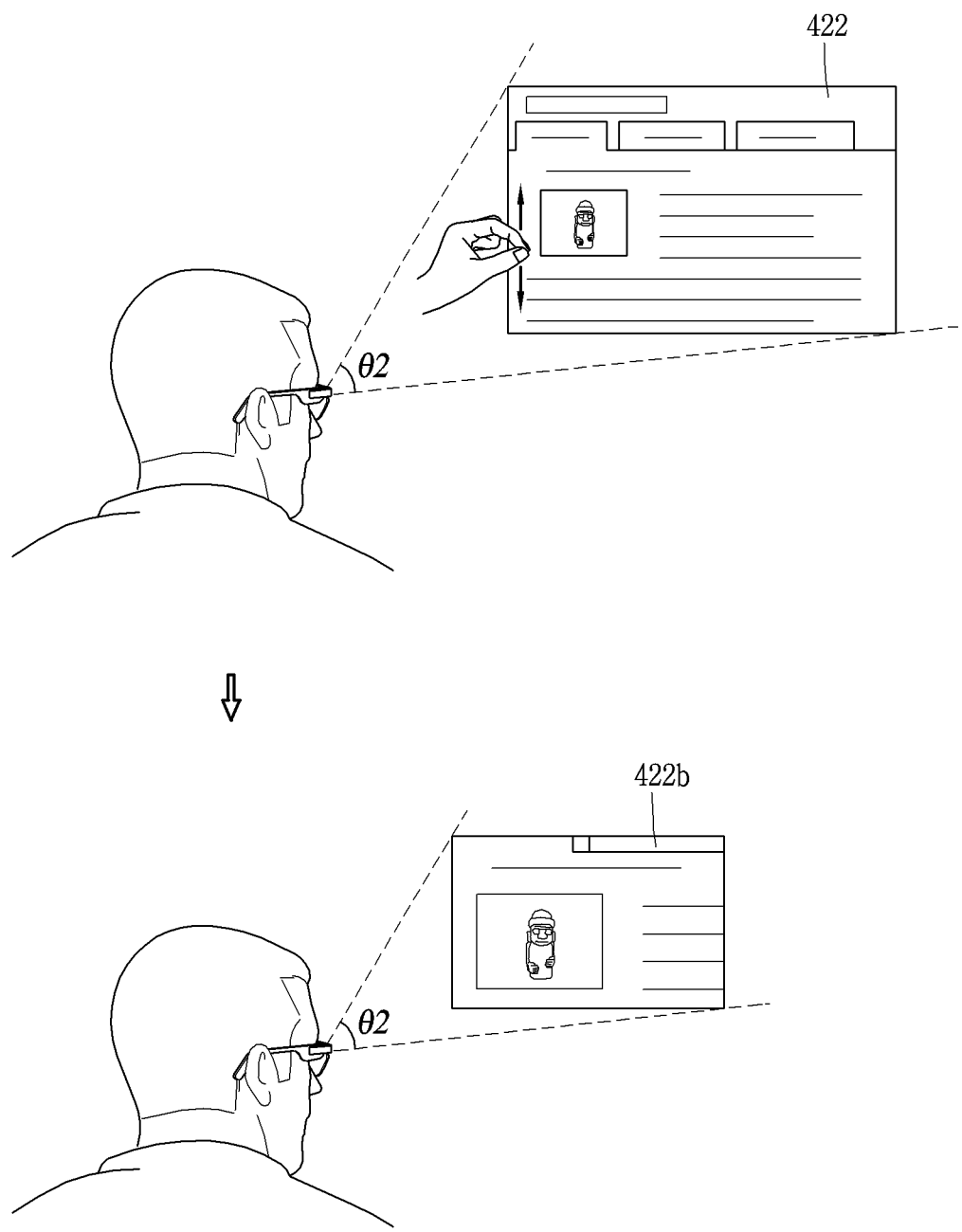

FIGS. 11A to 11C are conceptual views illustrating a control method of enlarging and reducing an image.

Referring to FIGS. 11A and 10B, the controller 180 detects a gesture on a second image 422 in the second mode. For example, the gesture may have a shape that two fingers are brought into contact with each other and then moved away from each other. The controller 180 outputs the second image 422 in an enlarging manner by moving the zoom lens portion 133 along the optical axis.

The controller 180 controls the display unit 151 to output a first enlarged image 422a, in which a part of the second image including an overlapped area with the gesture has been enlarged. The first enlarged image 422a is formed in substantially the same size as the second image 422 and is displayed at substantially the same position as the output area of the second image 422.

Referring to FIG. 11B, when the gesture is detected, the controller 180 displays a second enlarged image 422b, in which one area of the second image 422 has been enlarged. The controller 180 controls the display unit 151 and the optical unit 130 to output the second enlarged image 422 in a smaller shape than the second image 422 and at a closer position than the second image 422. According to this embodiment, the user can be provided with a visual effect of viewing an image at a closer position.

Figure 12A:
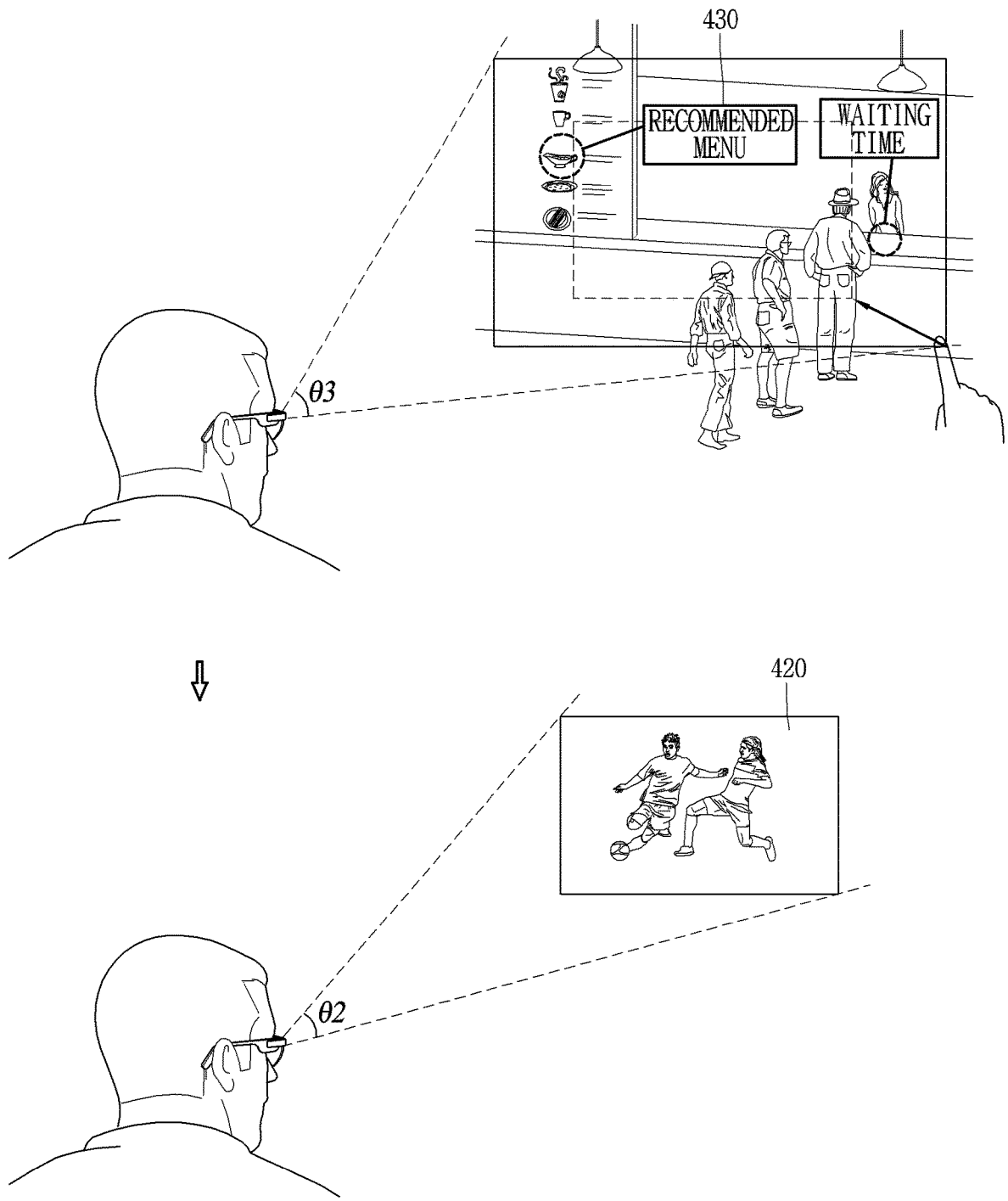
FIGS. 12A and 12B are conceptual views illustrating a mode change control method in accordance with another embodiment.
Figure 12B:
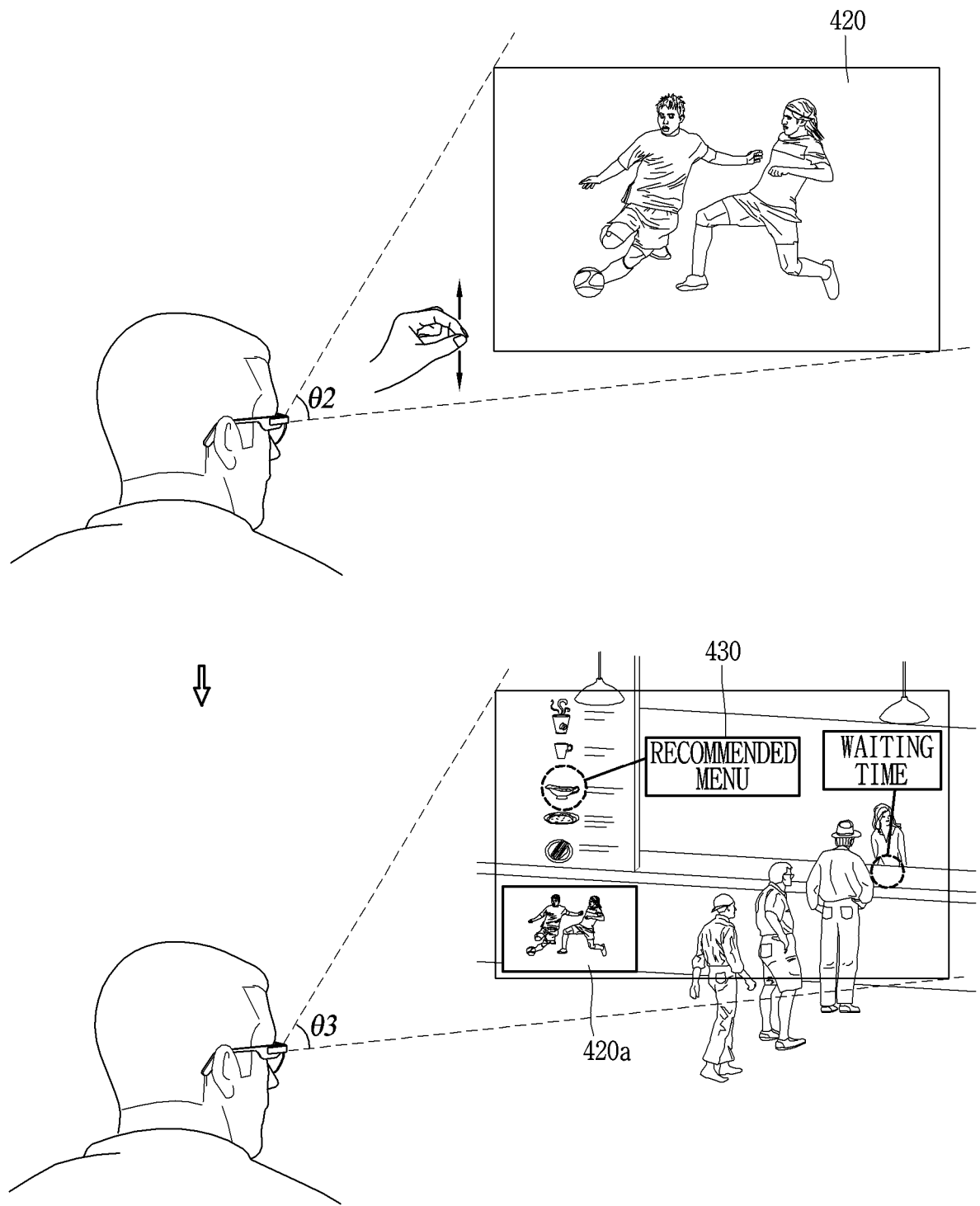

FIGS. 12A and 12B are conceptual views illustrating a mode change control method in accordance with another embodiment.

Referring to FIG. 12A, the third image 430 is displayed in the third mode. When a finger positioned to overlap an edge of the third image 430 moves, the controller 180 detects the movement of the finger as a gesture for changing the operating mode.

When the finger moves to a center of the third image 430, the controller 180 switches the third mode to the second mode. The controller 180 outputs the second image 420 when the operating mode is switched to the second mode. The controller 180 determines the size and output position of the second image 420 based on the position of the finger forming the gesture.

Referring to FIG. 12B, the controller 180 switches the second mode to the third mode when a gesture in a preset shape is detected while the second mode is activated, and controls the display unit 151 to output a window 420a corresponding to the second mode, together with the third image 430.

When the gesture is detected even while the first mode is activated, the controller 180 activates the third mode immediately and outputs an image of the previously activated operating mode together.

According to this embodiment, faster switching to a desired operating mode can be executed.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The embodiments of the present invention provide a glass type terminal that provides an image at a different angle of view according to an operating mode, and thus can be applied to various related industrial fields.

What is claimed is:

1. A glass type terminal, comprising:
a frame formed to be fixable to a user's head;
a display mounted on the frame and configured to output visual information;
an optical module having at least one lens and forming an image of the visual information;
a user input key configured to receive an input of a control command for changing an operating mode;
a gesture sensor configured to sense a gesture formed by a user's hand; and a controller configured to:
in a first operating mode, control the display to output first visual information and control the optical module to form an image of the first visual information having a first focal length,
execute a function corresponding to a second operating mode according to the input of the control command for changing the operating mode,
in response to the execution of the function, control the display to change the first visual information to second visual information and control the optical module to form an image of the second visual information having a second focal length different from the first focal length, determine the gesture sensed in an output state of the image as the input of the control command,
generate the input of the control command when a distance between the frame and the user's hand is less than a preset reference distance, and
control the optical module to reduce a size of the image and move an output position of the image to be close to the frame when the distance exceeds the reference distance, wherein the size of the image is reduced and the output position of the image is moved adjacent to the frame when the operating mode is changed, and
wherein the input of the control command is generated by a gesture moving toward the frame.

2. The terminal of claim 1, wherein the size of the image and the output position of the image are changed based on the change of the second visual information having the second focal length.

3. The terminal of claim 2, wherein the optical module comprises a first lens in a convex lens shape, having an adjustable refractive index, and changing the size of the image, and a second lens in a concave lens shape, and having an adjustable refractive index.

4. The terminal of claim 3, wherein the controller changes the refractive index of the second lens to change a position where the image corresponding to the second visual information is formed.

5. The terminal of claim 1, wherein the display outputs an indicator indicating the change of the operating mode when the distance between the user's hand and the frame corresponds to the reference distance.

6. The terminal of claim 1, wherein the controller controls the optical module to form the image at an angle of view corresponding to the first operating mode and to form the changed image of screen information by changing the angle of view in response to the change of the operating mode.

7. The terminal claim 1, wherein the controller controls the optical module such that the output position of the image corresponding to the first visual information is changed to a position where a finger making the gesture is sensed.

8. The terminal of claim 7, wherein the controller controls the display to simultaneously output a control icon for controlling the image based on the gesture.

9. The terminal claim 1, wherein the controller, when an icon corresponding to a preset operating mode is included in the image, activates the preset operating mode based on a control command for selecting the icon.

10. The terminal of claim 3, wherein the optical module further includes a zoom lens portion disposed to overlap the first and second lenses and configured to be movable to enlarge and reduce the image.

11. The terminal of claim 10, further comprising a gesture sensor configured to sense a gesture for enlarging one area of the image, wherein the controller controls the display to switch the image to an enlarged image corresponding to a part of the image based on the gesture.

12. The terminal of claim 11, wherein the optical module is controlled to change a size of the enlarged image and adjust an output position of the enlarged image.

13. The terminal of claim 1, wherein the user input key is mounted on the frame and is configured to receive a drag touch applied along one direction for changing the operating mode.

14. The terminal of claim 13, wherein the optical module changes the size and the output position of the image in a state where the operating mode is activated based on a drag touch applied along another direction.

15. A method for controlling a glass type terminal, the method comprising:
- in a first operating mode, outputting first visual information and displaying an image of the first visual information having a first focal length by an optical module including a plurality of lenses;
- receiving an input of a control command for changing an operating mode;
- executing a function corresponding to a second operating mode according to the input of the control command for changing the operating mode;
- in response to the execution of the function, changing the first visual information to second visual information based on the change of the operating mode;
- displaying an image of the second visual information having a second focal length different from the first focal length by the optical module;
- determining a gesture sensed in an output state of the image as the input of the control command;
- generating the input of the control command when a distance between the frame and the user's hand is less than a preset reference distance; and
- controlling the optical module to reduce a size of the image and move an output position of the image to be close to the frame when the distance exceeds the reference distance,
- wherein the size of the image is reduced and the output position of the image is moved adjacent to the frame when the operating mode is changed, and
- wherein the input of the control command is generated by a gesture moving toward the frame.

16. The method of claim 15, wherein the size and the output position of the image of the changed visual information is changed based on the change of the focal length.

* * * * *